(12) United States Patent
Tudor

(10) Patent No.: US 6,264,841 B1
(45) Date of Patent: *Jul. 24, 2001

(54) METHOD FOR TREATING CONTAMINATED LIQUIDS

(76) Inventor: Helen E. A. Tudor, 136 E. 56th St., Apt. 11F, New York, NY (US) 10022

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/394,522

(22) Filed: Sep. 10, 1999

Related U.S. Application Data

(63) Continuation-in-part of application No. 08/673,196, filed on Jun. 27, 1996.
(60) Provisional application No. 60/000,760, filed on Jun. 30, 1995.

(51) Int. Cl.$^7$ ........................................ C02F 1/42
(52) U.S. Cl. .................... 210/688; 210/912; 210/913
(58) Field of Search ................................ 210/688, 682, 210/911, 912, 913, 702

(56) References Cited

U.S. PATENT DOCUMENTS

| | | |
|---|---|---|
| 2,040,879 | 5/1936 | Rigby . |
| 3,533,940 | 10/1970 | Peniston et al. . |
| 3,630,681 | * 12/1971 | Arikawa ................................. 23/230 |

(List continued on next page.)

FOREIGN PATENT DOCUMENTS

| | | |
|---|---|---|
| 3537256 | 4/1987 | (DE) . |
| 61-145108 | 7/1986 | (JP) . |
| 62-128920 | 6/1987 | (JP) . |
| 63-215510 | 9/1988 | (JP) . |
| 03-106489 | 5/1991 | (JP) . |

OTHER PUBLICATIONS

Bochinski, Julianne Blair, "The Complete Handbook of Science Fair Projects (first edition)," John Wiley & Sons, 1991, pp. 64–66.*
Bochinski, Julianne Blair, "The Complete Handbook of Science Fair Projects (revised edition)," John Wiley & Sons, 1996, pp. 1–3, 68–70.*
www.lib.iastate.edu, Iowa State University Library Catalog (web searchable), entry for Bochinski, Julianne Blair, "The Complete Handbook of Science Fair Projects," John Wiley & Sons, 1991 (first edition) (downloaded from web Apr. 26, 2000).*
www.bibliofind.com search results for query "complete handbook of science fair," downloaded Apr. 27, 2000.*
www.amazon.com listing for Bochinski, Julianne Blair, "The Complete Handbook of Science Fair Projects (revised edition)," John Wiley & Sons, 1996, downloaded Apr. 27, 2000.*

(List continued on next page.)

Primary Examiner—Chester T. Barry
(74) Attorney, Agent, or Firm—Rosenberg, Klein & Lee

(57) ABSTRACT

A method of removing a dissolved metal constituent from a contaminated liquid is provided. The method comprises the steps of: providing a flow stream containing the contaminated liquid; providing a plurality of shell components formed by comminuting a shell stock including at least one shell having a biomineralized calcium carbonate composition; combining the shell components with the flow stream; and converting at least one shell component to a substantially insoluble biometallic nodule by maintaining contact between the shell components and the dissolved metal constituent over a predetermined time period. The biometallic nodule thus formed contains at least a portion of the metallic constituent in a biogenic metallic carbonate form. After their formation, the biometallic nodules are separated from the treated flow stream.

28 Claims, 7 Drawing Sheets

U.S. PATENT DOCUMENTS

| | | |
|---|---|---|
| 3,635,818 | 1/1972 | Muzzarelli . |
| 3,754,789 | 8/1973 | Hering . |
| 3,862,122 | 1/1975 | Peniston et al. . |
| 3,890,225 | 6/1975 | Kajiyama . |
| 3,937,783 | 2/1976 | Wamser et al. . |
| 3,956,164 * | 5/1976 | Walker ................................ 252/180 |
| 4,031,025 | 6/1977 | Vanlerberghe et al. . |
| 4,125,708 | 11/1978 | Masri et al. . |
| 4,127,639 | 11/1978 | Piret et al. . |
| 4,156,647 | 5/1979 | Nieuwenhuis . |
| 4,186,088 | 1/1980 | Fitch et al. . |
| 4,199,496 | 4/1980 | Peniston et al. . |
| 4,285,819 | 8/1981 | Yen et al. . |
| 4,522,723 | 6/1985 | Kauffman, et al. . |
| 4,532,267 | 7/1985 | Allan . |
| 4,587,021 * | 5/1986 | Wheeler ............................... 210/698 |
| 4,684,529 | 8/1987 | Ueno . |
| 4,775,650 | 10/1988 | Portier . |
| 4,862,975 | 9/1989 | Maillet et al. . |
| 4,882,066 | 11/1989 | Portier . |
| 4,897,896 | 2/1990 | Gallant . |
| 4,933,076 | 6/1990 | Oshima et al. . |
| 4,958,011 | 9/1990 | Bade . |
| 4,958,012 | 9/1990 | Tokura et al. . |
| 4,990,339 | 2/1991 | Scholl et al. . |
| 4,992,180 | 2/1991 | Onodera et al. . |
| 5,010,181 | 4/1991 | Coughlin . |
| 5,057,141 | 10/1991 | Rodriquez-Kabana et al. . |
| 5,114,595 | 5/1992 | Hensley . |
| 5,160,622 | 11/1992 | Gunderson et al. . |
| 5,169,682 | 12/1992 | Asai . |
| 5,236,492 | 8/1993 | Shaw et al. . |
| 5,244,469 * | 9/1993 | Shimoyama et al. .................... 8/438 |
| 5,281,338 | 1/1994 | Harris et al. . |
| 5,336,415 | 8/1994 | Deans . |
| 5,393,435 | 2/1995 | Deans et al. . |
| 5,433,865 | 7/1995 | Laurent . |
| 5,453,203 | 9/1995 | Higuchi . |
| 5,543,034 * | 8/1996 | Hilbertz ............................... 205/688 |
| 5,543,056 | 8/1996 | Murcott et al. . |
| 5,762,903 | 6/1998 | Park et al. . |
| 6,001,190 * | 12/1999 | El-Shoubary et al. ................. 134/10 |

OTHER PUBLICATIONS www.nsf.gov, abstract of NSF award #9529946, SBIR Phase II, Oceanix Biosciences Corp., project designed to establish the commercial feasibility for use of novel marine microbial polysaccharide in removal of heavy metals.*

NSF Award Abstract—#9313317, Metal Sequestering by Microorganisms in and from Aquatic Environments. downloaded from www.nsf.gov on Apr. 27, 2000.*

NSF Award Abstract—#9117165, Investigation of Trace Metal Sequestering by Polyphosphate Bodies in Picoplankton, downloaded from www.nsf.gov on Apr. 27, 2000.* search results at http://www.columbia.edu/cgi-bin/lookup.pl for "tudor".*

"Removal of Heavy Metals from Liquids Using Chitosan and Fish Scales", Ph.D. Dissertation of T. Yang, Cornell University, 1984.

* cited by examiner

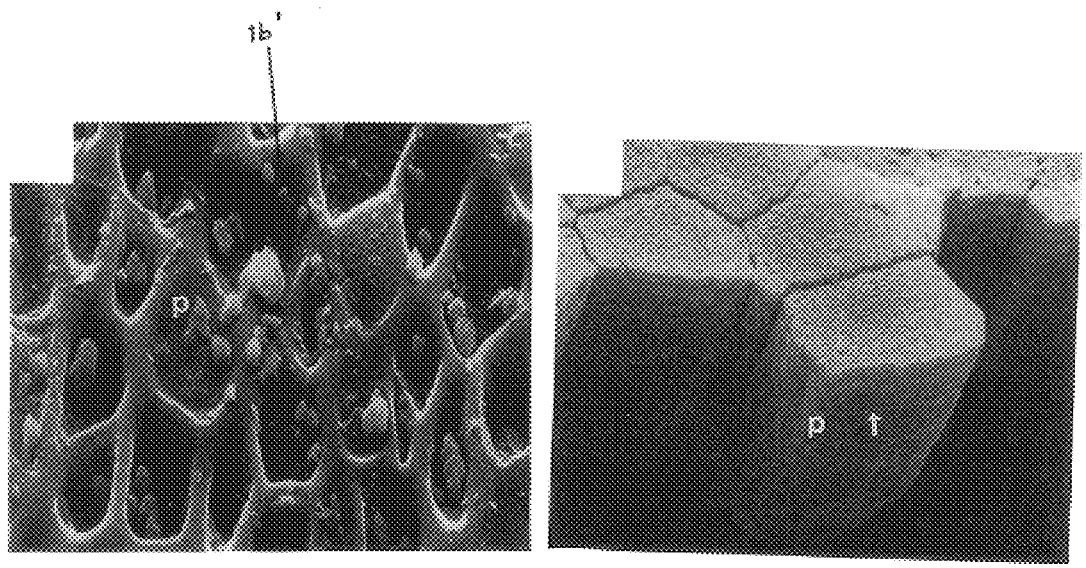
FIG. 7
PRIOR ART
FIG. 8
PRIOR ART
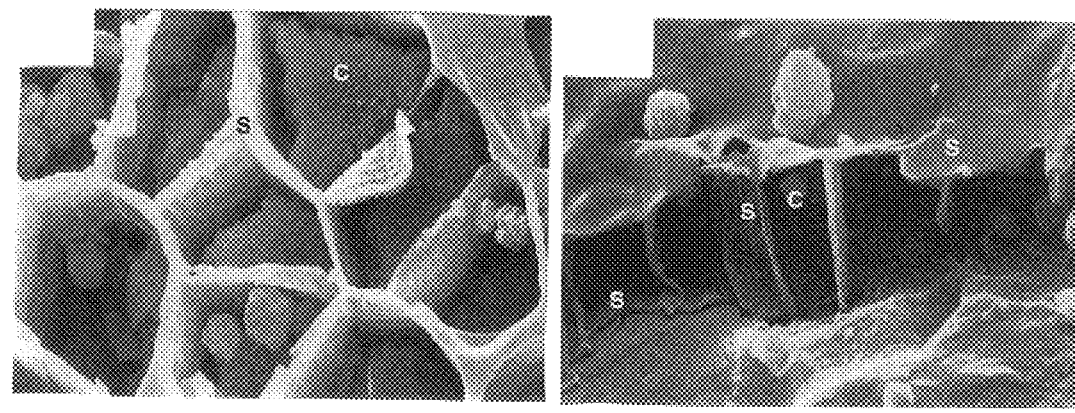
FIG. 9
PRIOR ART
FIG. 10
PRIOR ART

METHOD FOR TREATING CONTAMINATED LIQUIDS

RELATED PATENT INFORMATION

This is a Continuation-in-Part of U.S. patent application, Ser. No. 08/673,196, filed Jun. 27, 1996, which is based upon U.S. Provisional Patent Application, Serial No. 60/000,760, filed on Jun. 30, 1995.

BACKGROUND OF THE INVENTION

1. Field of the Invention

The subject method for treating contaminated liquids is directed to a method for removing various undesirable constituents from a liquid. More specifically, the subject method is one capable of removing from a contaminated liquid even heavy metal dissolved constituents present in high concentrations. In particular applications, the subject method is capable of removing dissolved heavy metal impurities present at concentrations an order of magnitude greater than 1,000 parts per million (ppm). The subject method is thus capable of removing dissolved heavy metal impurities without requiring any intermediate step for such things as pH adjustment of the liquid or any introduction of chemical additives to effect chemical precipitation in the liquid.

The potentially harmful effects to living beings of contaminating impurities in liquids, particularly in surface waters, has long been widely recognized. The types of harmful impurities, or contaminants, are as numerous and diverse as their various sources. Of the many potentially harmful contaminants, dissolved inorganics like metal pollutants, especially heavy metal pollutants, are known to be particularly pervasive, both in terms of their apparent toxicity to surrounding life forms, and in terms of the quantities and concentrations in which they are found, for example, in industrial effluents, at Superfund sites, and in the products of dredging operations. Toxic metal pollutants are not subject to destruction via biological or thermal oxidation, as organic industrial pollutants may be. Dissolved inorganic pollutants, such as lead or cadmium, moreover, are generally without any substantial 'assimilative capacity'—not as to the earth, water, atmosphere, nor any living organisms.

Many industrial processes yet generate and release into surrounding soils and aquatic systems great quantities of waste materials that persist as long-term sources of heavy metal pollutants. Particularly alarming is the fact that ionic species predominate in these pollutants, making them readily available for biological uptake. Not only by marine life, but ultimately by humans.

Numerous attempts have heretofore been made to treat liquids laden with metal contaminants. These attempts may generally be classified into three broad categories—those methods wherein a dissolved metal contaminant is precipitated by the introduction of an activating composition, and appropriate adjustment of pH; those methods wherein removal of dissolved species of contaminants is attempted by use of membrane processes, or by adsorption, chelation, ion-exchange, and sequestration employing various materials; and, those methods wherein the removal of non-dissolved solid contaminants suspended within a liquid is attempted using various solid/liquid separation techniques such as sedimentation (with flocculating agents), flotation, straining and filtration, screening, gravity separation (centrifuging, magnetic separation), and the like.

Significant drawbacks exist with each category which severely curtail the practicability of its methods for many applications. Precipitating metals by introducing a lime or carbonate composition into the given liquid, for instance, necessitates active and precise control of the operating pH. Moreover, the precipitated sludge material that results from the process is typically of an extremely fine size (actually being gelatinous in nature for certain cases), possesses poor filterability and dewatering characteristics, and, depending on the metal, exhibits very high residual metal solubility at near-neutral pH levels. The process reaction time typically characterizing precipitation processes is, furthermore, quite slow and necessarily requires the additional steps following precipitate formation of coagulation and flocculation, settling, and sand filtration.

These processes present significant challenges—from the need for preserving the proper conditions to permit sufficient settling, to the need for dewatering or other such subsequent procedure, and to the need for handling the material finally yielded. What typically results from filtration is a residue formed of an environmentally unstable sludge material. Proper disposal of such material, too, poses significant challenges fraught with well-recognized environmental implications.

Methods of dissolved metallic ion removal that rely upon membrane or other processes such as adsorption, chelation, ion-exchange, complexation and sequestration by various materials (mosses, algae, bacteria . . . ), and phytoremediation represent high-cost concentration processes. They are hindered by such things as membrane clogging, 'spent adsorption sites,' and material overload failures (due to surges in metal concentrations).

Methods of removing dissolved metallic ions employing materials such as chitin, chitosan, and various derivatives thereof are known, but found to be expensive, slow-acting, and overly limited in uptake capacities. Those methods, therefore, prove efficacious, at best, only in applications where dissolved pollutants having very low metal concentrations—typically on the order of no more than 500 ppm—are to be treated.

An additional drawback in these methods has been the lack of attention to such factors as the quality of the starting material from which the chitin or chitosan material is obtained and the purification processes to which they are subjected. Without adequate control of these factors, an unpredictable, non-reproducible altering of the extracted chitin's structure, for instance, may result, potentially diminishing the extracted material's desirable properties and disturbing the consistency and uniformity of the resulting preparations. Consequently, the native chitin structure (and that of any derivatives) are essentially lost, along with the advantages that might otherwise have been realized. Also, the altered chitin product(s) are often of such variability in make-up and properties as to render them virtually useless in many of those applications requiring reproducibility of results and product reliability, as noted in U.S. Pat. No. 4,958,011 issued to Bade.

There is, therefore, a need for a contaminated liquid treatment method adapted for highly efficient, reliable removal of such contaminants as dissolved heavy metal pollutants present even at high concentrations. The need is for a method that is not only simple, but is one which yields an environmentally stable by-product unencumbered by the problems associated with by-products of liquid treatment methods heretofore known.

2. Prior Art

Methods and systems for treating contaminated liquids, even those incorporating organic shell materials, are known in the art. The prior art known to Applicant includes U.S. Pat. Nos. 4,156,647; 3,635,818; 4,882,066; 5,543,056; 5,010,181; 4,125,708; 4,992,180; 5,393,435; 4,031,025; 4,522,723; 5,453,203; 4,285,819; 4,755,650; 3,533,940; 5,336,415; 5,433,865; 3,890,225; 4,933,076; 4,990,339; 4,186,088; 5,114,595; 3,754,789; 3,937,783; 5,169,682; 4,127,639; 4,958,011; 4,199,496; 4,532,267; 4,958,012; 5,281,338; 5,160,622; 5,236,492; 5,057,141; 4,862,975; 5,762,903; 4,684,529; 4,897,896; 2,040,879; and, 3,537,256; as well as Japanese Patent Documents #83/266,122; #87/462,003; #84/266,396; and, #89/246,087. Such known methods and systems, however, fail to recognize and therefore fail to exploit the adaptability of certain organic shell materials to forming a substantially insoluble, granular by-product by consuming various metal ions found in contaminated liquids. Known methods and systems, therefore, fail to realize the high efficiency of metal pollutant removal from the contamninated liquids realized in accordance with the present invention, much less to do so in a manner that yields substantially insoluble nodules that may, subsequently, be handled simply and conveniently for disposal or other purposes.

U.S. Pat. No. 4,156,647, for instance, is directed to a process and apparatus for removing impurities from liquids wherein particulate shrimp, lobster, or crab shells are employed in a liquid treatment vessel to remove metal impurities "present in small quantities" in water streams passed therethrough. The reference acknowledges the prior art recognition of the ion exchange or sequestering properties which render chitin and chitosan somewhat effective in metal uptake. Accordingly, the process seeks very specifically to exploit the chitin found in or extracted from the shell material "or other source" to sequester the metal impurities of the passing water streams.

The process reflects a failure to recognize any beneficial properties of the biomineralized shell materials in removing such metal impurities from the water streams. Rather, the process relies wholly upon properties attributable to the given shell material's incidental chitin content. Consequently, the process precludes from use broad classes of shell materials, such as bivalve molluscs, for being virtually chitin-free, though they are revealed by the present invention to be highly efficacious for the given purpose. Also, the process prescribes an adjustment of the pH in the water stream entering the treatment vessel, and yields extracted metal material in a form that subsequently requires pyrolysis (controlled heating and decomposition) or some other further processing upon recovery from the water stream. Unlike the subject method, the process does not produce a by-product containing the extracted metal in an insoluble, granular form which would render it conveniently recoverable by simple collection means.

The failure to recognize the highly advantageous biogenic properties of shell material wholly unrelated to the presence or absence of chitin therein limits this prior art process to the self-acknowledged removal of only metal impurities "present in small quantities." Quantitatively, it is clear from the prior art expressly referred to by the reference, that such "small quantities" correspond to concentrations from below 100 ppm to approximately 1,000 ppm. Concentrations above 1,000 ppm were, in fact, considered in the prior art to represent "gross amounts" which necessitated, first, the contaminated liquid's pretreatment using a precipitation process. These concentration levels thought to limit the domain of effective treatment in the prior art contrast rather sharply to the remarkably high levels of impurities removed in accordance with the present invention—levels typically ranging for certain metal impurities initially present, for instance, in concentrations between 30,000 ppm and 60,000 ppm. The contrast is particularly striking given that such treatment capacity is realized without any requisite pre- or post-treatment processes (precipitation, pH adjustment . . . ).

SUMMARY OF THE INVENTION

It is a primary object of the present invention to provide a method of treating a contaminated liquid with comminuted components of a preselected shell material to obtain substantially insoluble metallic nodules containing at least a portion of the liquid's impurities.

It is another object of the present invention to provide a simple, yet highly efficient method of removing a metal constituent from a contaminated liquid.

It is yet another object of the present invention to provide a method of removing a dissolved metal constituent from a contaminated liquid whereby comminuted components of one or more preselected shell materials are converted to substantially insoluble metallic nodules containing at least a portion of the metal constituent.

These and other objects are attained in accordance with the present invention by the method disclosed herein. The subject method of treating a contaminated liquid to remove, for instance, a dissolved metal constituent therefrom generally comprises the steps of: providing a flow stream containing the contaminated liquid; and, providing a plurality of shell components by comminuting substantially to a predetermined approximate particle size a shell stock including at least one shell containing a biomineralized calcium carbonate composition. The shell components are combined with the flow stream to mix those shell components with any metal constituent within the flow stream. The shell components are mixed with the metal constituent over a predetermined time such that one or more shell components are converted to insoluble biometallic nodules that contain at least a portion of the metallic constituent within a biomineralized structure. The biometallic nodules thus formed are, then, separated from the flow stream.

In particular embodiments of the subject method, the given contaminated liquid is treated for removing a dissolved heavy metal constituent therefrom. That is, the subject method treats the contaminated liquid for removing ions in solution of a metal characterized by an atomic number greater than 22.

BRIEF DESCRIPTION OF THE DRAWINGS

FIG. 7 is an SEM photomicrograph of a demineralized portion of an oyster shell valve;

FIG. 8 is an SEM photomicrograph of an oyster shell valve treated with a 100% bleach solution;

FIG. 9 is an SEM photomicrograph of a partially demineralized portion of an oyster shell valve;

FIG. 10 is an SEM photomicrograph of a substantially demineralized portion of an oyster shell valve;

DETAILED DESCRIPTION OF THE PREFERRED EMBODIMENTS

Figure 1:
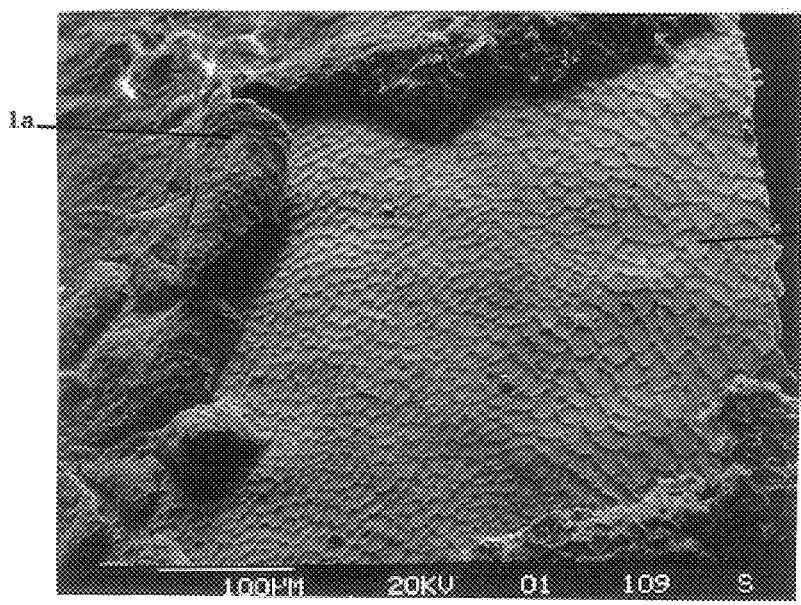
FIG. 1 is a scanning electron microscope (SEM) photomicrograph of a portion of a clam shell valve.

Conventional thought has heretofore been that chitin—a polysaccharide polymer found naturally in organic components of certain crustacean shells—is the factor rendering those crustacean shells marginally effective in removing certain metal constituents present in liquids at low concentration levels. Any degree of metal extraction capability demonstrated by a crustacean shell material was attributed entirely to the content of chitin in that material. Efforts were often made to extract the chitin so as to ideally employ the chitin for metal removal purposes, apart from the shell material itself. This focus on chitin rather than the shell material from which it might be derived is reflected in the preference given in the art to chitosan (a deacetylated form of chitin obtained by processing extracted chitin) over chitin for such purposes.

While chitin and chitosan have indeed demonstrated limited effectiveness in removing heavy metal ions from aqueous solution, empirical evidence repeatedly indicates that such effectiveness is limited—even if aided by auxiliary pretreatment processes—to removing ions present in an aqueous solution in concentrations no greater than about 1000–1500 ppm.

As described in following paragraphs, the subject method effectively upends this conventional thought, by obtaining far superior levels of metal ion removal from a contaminated liquid. The subject method comprises comminuting one or more preselected shell materials and combining with the contaminated liquid to cause contact between and mixing of the comminuted shell material with the metal constituent. Given sufficient time, this causes at least a portion of the shell material to be converted to biometallic nodules, each of which contains at least a portion of the liquid's dissolved metal constituent.

The method displays remarkable metal uptake capability, enabling the removal from the given fluid of dissolved metal constituent concentrations orders of magnitude greater than the concentrations that may be removed using chitin or chitosan. Moreover, the subject method exploits the realization that a material's shell composition is not merely incidental to the material's metal uptake capability, but quite central to that capability. It is revealing in this regard that the subject method yields remarkably high levels of metal uptake, even when utilizing oyster and other bivalve shell materials which are known to contain less than approximately 1% by weight chitin. The metal uptake effected in accordance with the subject method is, in fact, essentially independent of any uptake effected by virtue of the utilized shell material's chitin content.

A wide variety of impurities may be removed from a given liquid in accordance with the present invention. Those impurities may include even heavy metal ions of metals having an atomic number greater than 22. Depending on the particular impurity or impurities to be removed from a given liquid, the subject method preferably employs one or more shell material selected from a Bivalvia or Gastropoda class of the *Mollusca phylum*. In certain cases, at least a portion of the shell material may be selected from the Crustacea class of the *Arthropoda phylum*. The Bivalvia class of molluscs include such organisms as the Northern Quahog or Hard-Shell clam, *Mercenaria mercenaria*, Eastern oyster, *Crassostrea Virginica* oyster, Blue mussel, and *Mytilus edulis Linne*. The Gastropoda class of molluscs includes such organisms as snails, conchs, and whelks. While differing in metal uptake characteristics and, in some instances, possessing limited uptake capacity when compared to bivalve molluscs, certain portions of select Crustacea Arthropoda organisms such as the highly calcified cuticles of lobster or crab may be employed in certain embodiments of the subject method.

As indicated by the experimental results discussed in following paragraphs, different shell materials exhibit a wide variety of metal sorption characteristics, depending on the type of metal being treated for, its concentration, and the contact time. Different sorption characteristics have been found not only among shell materials belonging to different Phyla, but among shell materials belonging to the same class of particular Phyla. Different sorption characteristics are exhibited, for example, by *M. mercenaria* (Hard-shell clam) and *C. Virginica* (Eastern oyster). Given the unique metal-specific uptake capacities of the various shell materials, optimum combinations of distinct shell materials may conceivably be formulated to remove from a liquid a particular dissolved metal impurity or a particular mixture of dissolved metal impurities. Alternatively, the given contaminated feed stream may be treated sequentially in cascaded or in successively employed treatment units to fully remove the given impurities.

In accordance with the present invention, a shell stock including one or more such shell materials is comminuted to a particle size suitable for the intended application, typically 0.5 mm or smaller. The plurality of shell components thus formed are then contacted with the dissolved constituent impurities of the given liquid by use of suitable means for mixing the shell components with that polluted liquid such as, for example, a pellet reactor. The contact/mixing time is maintained over a sufficient time duration that biometallic nodules containing the impurities begin to nucleate and grow upon/within the shell components. Substantially insoluble, concreted nodules are thus crystallized about the nuclei defined at the shell components. Following the crystallization process, the resulting biometallic nodules may be separated from the treated liquid simply by draining.

The remaining nodules are bead-like in nature and may be disposed of without the need for any special handling procedure. Hence, neither the introduction of coagulants, coagulant aids, or other additives into the liquid; the incorporation of a flocculation step; nor any other special processing step is necessary. In prior art precipitation methods, the flaky precipitates or gelatinous sludge which remain in solution, for instance, are of such extremely fine size that coagulation and flocculation, as well as settling and sand filtration, steps are necessary to complete the treatment process. Furthermore, what results from the treatment process are great volumes of toxic sludge which rapidly multiply with increasing levels of the effluent concentrations to be treated. This end product requires careful, precise handling, if not additional chemical processing, for proper disposal.

Figure 19:
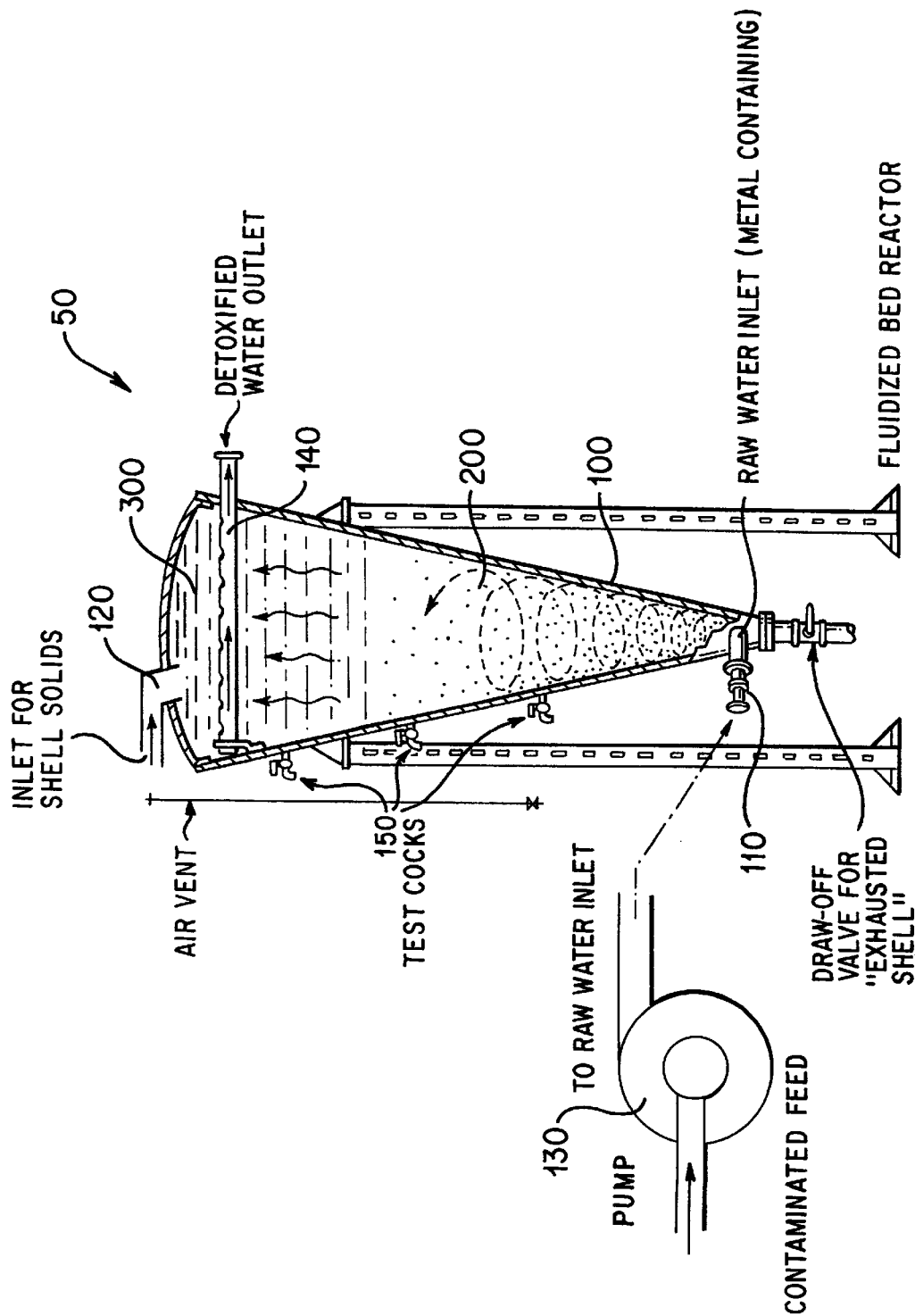

There is shown in FIG. 19 one exemplary fluidized bed reactor arrangement by which the subject method may be implemented. This is but one particular example of numerous means of implementing the subject method. The fluidized bed reactor arrangement is, thus, shown merely for illustrative purposes, the subject method not being limited to any particular implementation means.

As shown in the exemplary arrangement 50 of FIG. 19, a plurality of comminuted shell components 200 may be introduced into a reactor vessel 100 via its inlet 120 to form a bed as shown. The contaminated liquid to be treated may then be passed into the sealed bottom portion of the conically-shaped reactor vessel 100. The liquid may be injected by a pump 130 such that it follows a swirling, vortical path upwards through the bed of shell components 200 to cause immediate mixing. Upon continued injection of the contaminated liquid, the treated liquid 300 rises through a swirling motion and accumulate above the shell component bed 200, with the dissolved metal impurities being consumed and transformed into biometallic nodules that form upon individual shell components 200. The treated liquid portion 300 is released through a detoxified liquid outlet 140 as it accumulates sufficiently to cause its level to reach and exceed the outlet 140. A plurality of test cocks 150 are provided at spaced intervals along the length of the vessel 100 to permit testing of the liquid being treated at the corresponding points. The required contact or residence time, as well as the type and amount of shell component material 200 may be controlled responsive to such testing.

As the exemplary empirical experimental data discussed in following paragraphs will indicate, the contact or residence time—that is, the time during which contact between the shell components and the liquid's dissolved impurities is maintained—determines in part the quantity of impurities actually removed. The time consequently varies based upon such factors as the type of shell material being utilized, the nature and concentration of the impurity being removed, the configuration of the reactor or other vessel within which the contact is being effected, and the like. Given sufficient contact or residence time for the prevailing conditions, remarkably high uptake levels may be realized. For example, oyster shell material utilized in one embodiment of the present invention yields removal of approximately 150% of its own weight of lead when the contact time is extended to 24 hours, and ultimately yields removal of approximately 200% of its own weight of lead when the contact time is further extended, accordingly.

Turning now to the actual biochemical mechanism by which the removal of impurities is effected, the subject method exploits the biogenic properties pertaining to the biomineralized structure of particular biogenic shell materials. Shells belonging to bivalve mollusca and other classes contain biogenic calcium carbonates $CaCO_3$, formed by the process of biomineralization, whereby epithelial cells of the organism exude the necessary compounds to form an organic network of walls and sheaths (primarily composed of insoluble proteins) that collectively define a plurality of prismatic matrix cores. Some amino acid constituents of the resulting matrix serve to provide calcium-binding sites, thereby yielding a template for calcium carbonate nucleation. Electron microscopy of mollusc shell materials clearly reveals that all or part of the organic matrix constituents envelop or delineate individual mineral units such as prisms or lamellae. In certain cases, these units are further subdivided, with each sub-division separated by a matrix layer. Given an appropriate calcium concentration, calcium carbonate crystals are induced to grow within these pocket-like matrix cores. The gradual build-up of calcium carbonate eventually fills the matrix cores to yield a solid array of inorganic, biogenic mineral material held together by the soluble and insoluble polypeptide fractions making up the organic matrix. The polygonal shape of organic sheaths mirrors that of the enclosed mineral core, as shown in FIG. 9; and, an insoluble organic layer (conchiolin) bounds both their exterior and interior ends, as shown in FIG. 10.

When shell material having such biomineralized structure is comminuted as prescribed in the subject method, the conchiolin layers of the resulting shell components tend to separate from the prismatic array therebeneath, exposing that array for contact by the given dissolved impurities. Calcium ions then break away from the biomineralized structure to, effectively, be replaced by the metal impurity ions. These metal ions thus incorporate into the existing structure of the organic matrix framework, leading to nucleation and growth of biometallic crystal. Upon continued nucleation and growth of additional new biometallic crystals as additional metal ions come into contact with the matrix, a complete solid state transformation occurs. Through crystallization in this manner, a plurality of densely compact, bulbous protuberances form on and penetrate throughout the original matrix cores, ultimately encrusting entire shell components with biometallic crystals to produce generally ovoidal, knobby-surfaced nodules. This collectively yields, then, the solid, bead-like biometallic nodules, which having formed about the native matrix framework that had served as a parent template both for nucleation and growth of the new biometallic component, retain a significant measure of coherence and integrity based on the original shell's structural framework.

Referring to FIGS. 1–10, a series of scanning electron microscope (SEM) photomicrographs of readily available mollusc shells—specifically clam and oyster shells—are shown for illustrative purposes. The SEM images illustratively show the shell fragments prior to any exposure to metal ions. They clearly reveal the biomineralized structure that affords the shell's metal uptake capacity and the structural coherence of the shell components. The SEM photomicrographs of FIGS. 2, 6, 7, 8, 9, and 10 showing views of various shell material portions before the material's utilization in accordance with the present invention are taken from the reference: The *Eastern Oyster*, Ed. V. S. Kennedy and R. I. E. Newell, 1996, Maryland Sea Grant College, p. 158 et seq.

The SEM photomicrograph of FIG. 1 is a 200× magnification view of a clam shell valve inner layer. The conchiolin sheath material 1a is shown broken and rolled away to expose the biomineralized array structure 1b. The delineation of prismatic array elements by the walls of the organic matrix is apparent in the biomineralized structure 1b.

Figure 2:
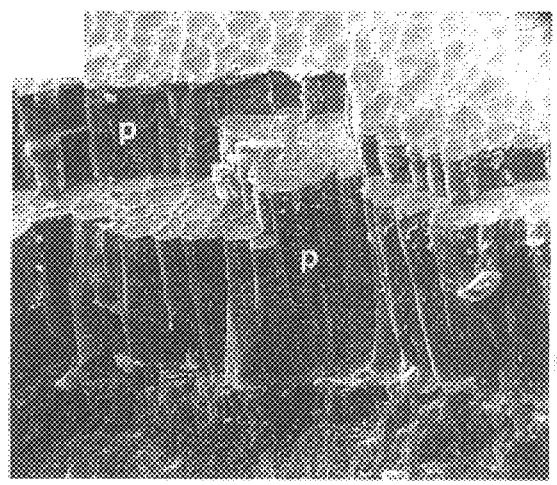
FIG. 2 is an SEM photomicrograph of a portion of an oyster shell valve.

The SEM photomicrograph of FIG. 2 shows a 4000× magnification view of a multi-layer fracture taken from an oyster shell valve. A sectional view of the biomineralized array structure's prismatic elements marked "p" are shown. The prismatic elements p are joined to a transversely extended sheet of conchiolin material marked "f."

Figure 3:
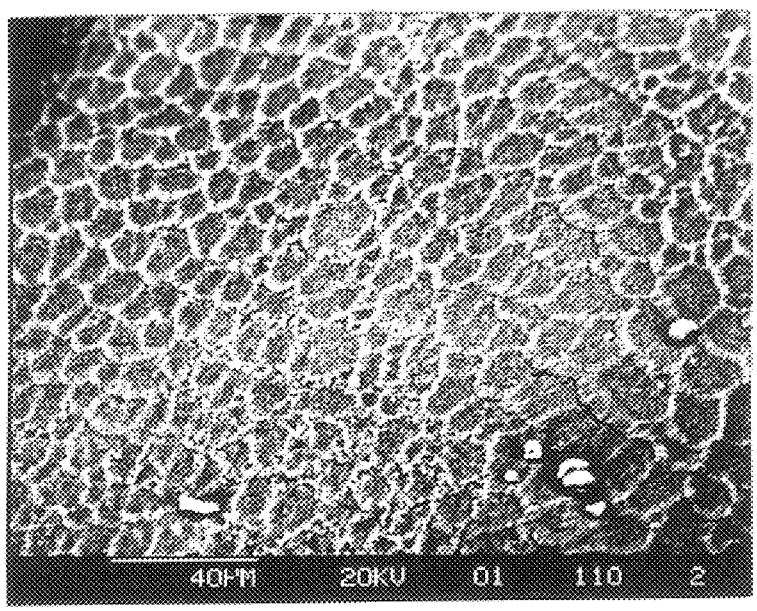
FIG. 3 is an SEM photomicrograph of a portion of a clam shell valve.

The SEM photomicrograph of FIG. 3 shows a 550× magnification view of a clam shell valve's prismatic array surface. The delineation of prismatic array elements by the organic matrix walls is more apparent than in the SEM of FIG. 1.

Figure 4:
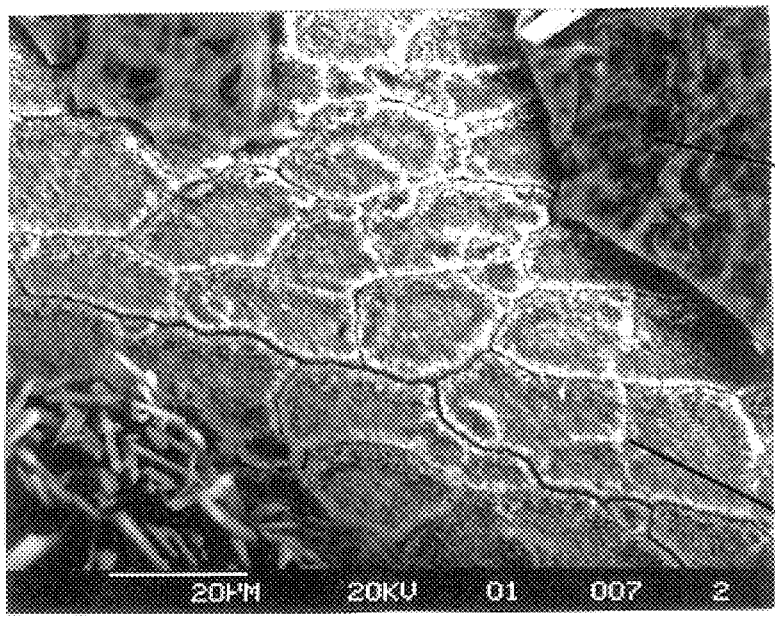
FIG. 4 is an SEM photomicrograph of a portion of a clam shell valve at a given magnification.
Figure 5:
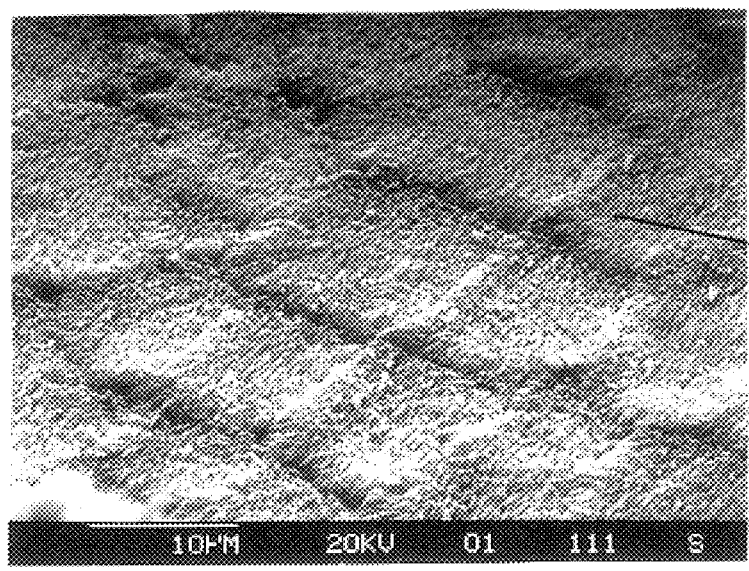
FIG. 5 is an SEM photomicrograph of the portion of a clam shell valve shown at FIG. 4, at a higher magnification.

The SEM photomicrographs of FIGS. 4 and 5 show successively higher 1000× and 2000× magnifications of the prismatic array elements of the biomineralized structure 1b. The surface texture and high regularity of each prismatic array element is evident in FIG. 5.

Figure 6:
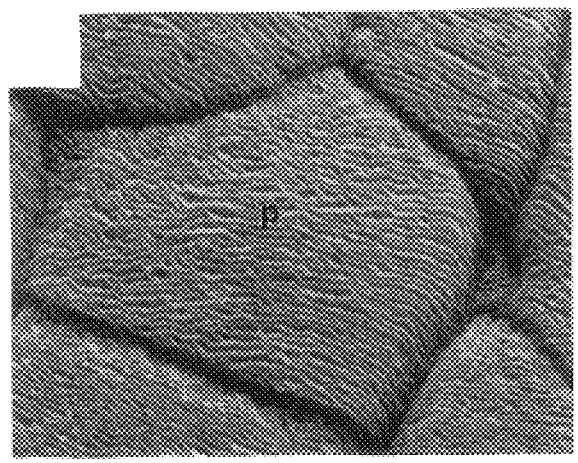
FIG. 6 is an SEM photomicrograph of a portion of an oyster shell valve treated with a 20% bleach solution.

The SEM photomicrograph of FIG. 6 is a 4600× magnification view of an oyster shell valve's prismatic array element p. The shell sample in this view has been treated with a 20% bleach solution which dissolves the conchiolin material to more clearly reveal the structural details of the array element's inorganic component. Note that the organic matrix walls have also been dissolved partially, leaving grooves to separate adjacent prismatic array element portions p.

The SEM photomicrograph of FIG. 7 shows a 1000× magnification view of an oyster shell valve material wherein the prismatic array elements p have been partially demineralized to more clearly reveal the organic matrix walls 1b'.

The SEM photomicrograph of FIG. 8 is a 1850× magnification view of an oyster shell valve's adjacent prismatic array elements p. The shell sample in this view has been treated with a 100% bleach solution to dissolve substantially all the organic matrix wall material surrounding each prismatic array element p, as well as the conchiolin material. The inorganic component's structure is thus clearly visible.

The SEM photomicrograph of FIG. 9 is a 1900× magnification view of an oyster shell valve's biomineralized structure following a pre-treatment to partially de-mineralize the mineral cores of the prismatic array elements. The organic matrix walls, or sheaths s, separating adjacent cores are clearly visible.

The SEM photomicrograph of FIG. 10 is a 1900× magnification view of an oyster shell valve's prismatic array elements wherein most of the mineral cores marked "c" have been dissolved by pretreatment. In this sample, most of the conchiolin material as well as most of the organic matrix walls—all marked "s"—are shown substantially intact.

An important concept manifest in the method of the present invention is the significant contribution of a given shell material's biomineralized structure to that shell material's impurity extraction capacity. As with bivalve shell materials, approximately 95% of limestone, for instance, is composed of calcium carbonate. Yet, without the biomineralized structure of bivalve and other shell materials, the extraction capacity of limestone is orders of magnitude less than that of shell materials realized in accordance with the present invention. Furthermore, the ultra-fine, sub-micron fluffy precipitate formed upon impurity extraction utilizing limestone is strikingly different in nature from the solid nodules formed utilizing shells in accordance with the present invention—which advantageously affords the use of simple and direct solid/liquid separation steps following treatment.

The physical attributes of particular shell materials' biomineralized structure facilitate a strong binding of the carbonate calcium. When impurities such as heavy metal ions are brought and maintained in contact with the biomineralized structure for a predetermined duration, the metal ions substitute for the calcium ions in the shell material's biomineralized structure, rather than simply being adsorbed onto the shell surface. The organic matrix walls which effectively serve to define 'anchorage' compartments for the calcium carbonate mineral cores then serve such function for the resulting metal carbonate cores. Where, for example, lead forms the impurity ions, biometallic nodules containing lead carbonate, $PbCO_3$, cores within the organic matrix compartments, are formed, with virtually a one-to-one molar exchange of calcium for lead ions. Given sufficient contact time and sufficient relative quantities, the process would continue until either all the calcium ions in the given stock of shell components is thus replaced by the lead ions, or all the lead ions are thus consumed. In one illustrative application of the subject method, one gram of comminuted *C. Virginica* oyster shell material was found to consume approximately 2 grams of lead present at a concentration of 40,000 ppm in an aqueous solution. This exchange of lead for calcium in the biomineralized structure was found to occur on a one-to-one molar basis. Metal uptake was found to take place without the need to artificially change the natural pH of the solution. The shell particle become gradually encrusted with crystallized clusters of lead carbonate, the substance of which ultimately penetrates within and throughout the body of the shell particle itself until that shell particle is fully transformed into a lead carbonate nodule. In this manner, the shell component's original structural integrity is preserved throughout the transformation stages.

Figure 11:
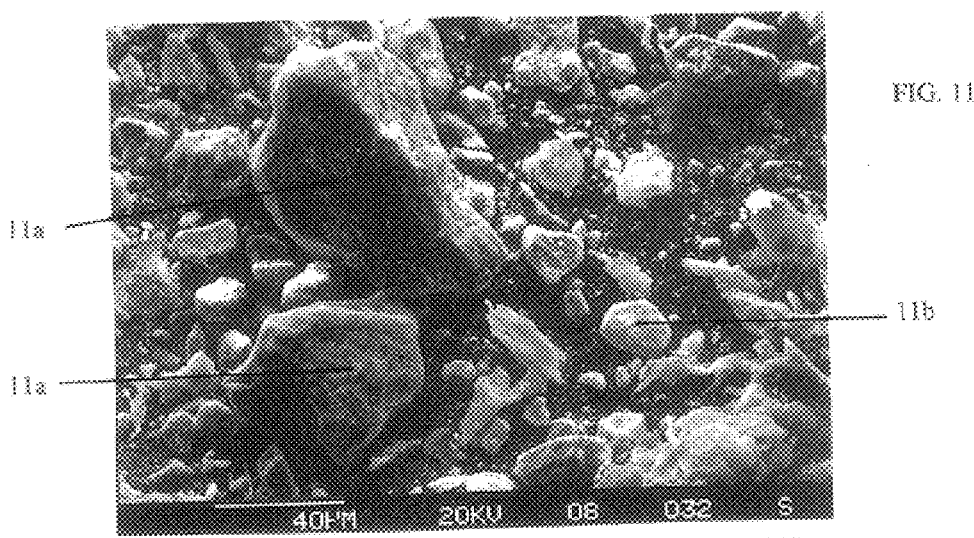
FIG. 11 is an SEM photomicrograph of a plurality of clam shell components following exposure to a dissolved metal impurity in one embodiment of the method of the present invention, at a given instant in time.
Figure 12:
FIG. 12 is an SEM photomicrograph imaged in a back-scattered electron mode, and at a higher magnification, of the view shown in FIG. 11.

Referring now to FIGS. 11–15, there are shown SEM photomicrographs at various magnifications and various stages of the crystallization process in an exemplary application of the subject method. In the given application, comminuted components of a clam shell valve are combined with water containing lead ions present at a concentration of 10,000 ppm. The SEM image of FIG. 11 is a 500× magnification view of the clam shell components, some (11a) of which are undergoing various stages of transformation to lead carbonate, and others (11b) of which have been fully transformed. The SEM image of FIG. 12 is a 1000× magnification of the sample viewed in FIG. 11. The SEM image in this view was obtained using a back-scattered electron mode of operation which enhances the visibility of regions containing elements of high atomic number such as lead. These regions appear as bright areas on the image. The SEM image shows areas of differing brightness. The areas of intense brightness represent those regions wherein the lead ions from the solution have been abstracted and incorporated by the shell component to form lead carbonate therein, while the areas of less brightness indicate those regions wherein only certain portions are lead-rich.

Note that some shell components 12a are characterized by areas of differing brightness. Those shell components are ones undergoing various stages of transformation at which only certain regions have crystallized only partially to lead carbonate. Thus, only certain portions thereof are lead-rich (and appear as bright areas). Other shell components 12b appear bright white in their entirety. They represent shell components which are entirely lead-rich, having fully transformed to lead carbonate nodules.

Figure 13:
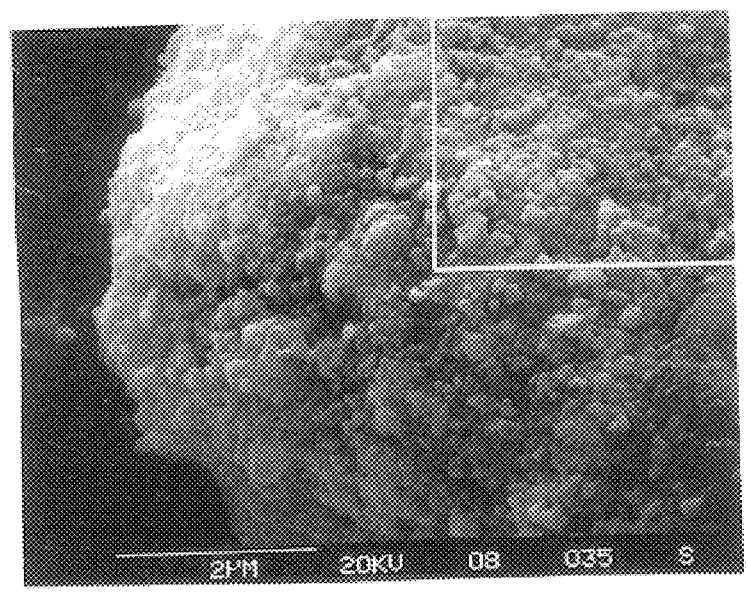
FIG. 13 is an SEM photomicrograph of a portion of the view shown in FIG. 12, at a higher magnification.

The SEM photomicrograph of FIG. 13 is a 15000× magnification view of the highly-bright, lead-rich nodule 12b of FIG. 12. The densely compact, knobby protuberances of the resulting nodule are clearly visible. An X-ray analysis of that portion of the resulting nodule delineated by the square boundary at the upper right-hand region of the image reveals that the nodules are, indeed, composed of lead carbonate.

Figure 14:
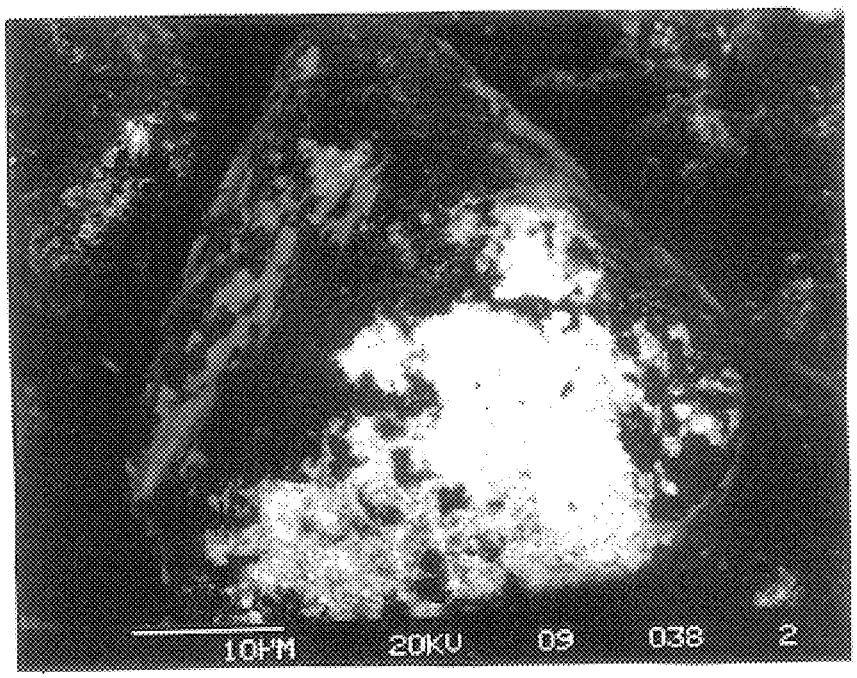
FIG. 14 is an SEM photomicrograph imaged in a back-scattered electron mode of a clam shell component partially converted to a lead carbonate granule in one embodiment of the method of the present invention.

The SEM photomicrograph of FIG. 14 is a 2000× view of a clam shell component that has yet to be fully converted to a lead carbonate nodule. The bright regions at the front portions of the shell component indicate those portions wherein lead carbonate has crystallized, whereas the darker regions towards the back portions of the shell component represent those portions still containing calcium carbonate. Note that even during this transition period in which only a portion of the shell component shown has been converted to contain lead carbonate, the overall structural integrity of the shell component remains undisturbed.

Figure 15:
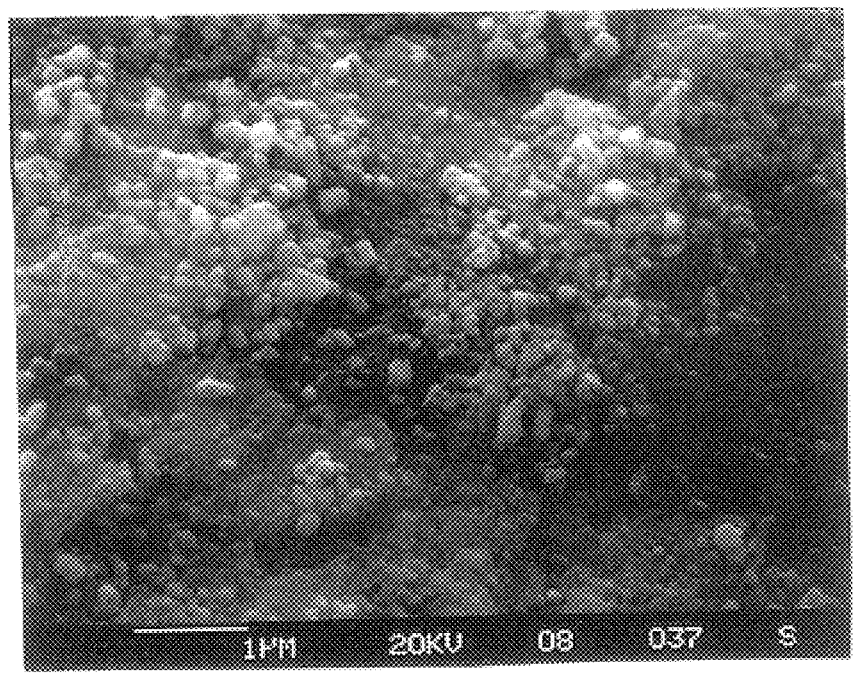
FIG. 15 is an SEM photomicrograph of a portion of the view shown in FIG. 14, at a higher magnification.

The SEM photomicrograph of FIG. 15 shows in greater detail a 15000× magnification view of the bright portions of the shell component shown in FIG. 14. Again, the nodular protuberances forming that portion is found to be composed entirely of lead carbonate.

Figure 16:
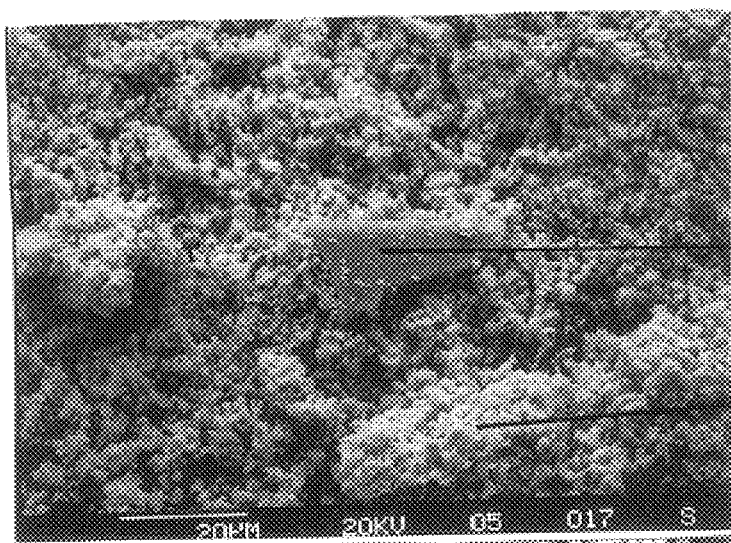
FIG. 16 is an SEM photomicrograph imaged in a secondary electron mode of precipitates formed in accordance with a prior art precipitation method employing limestone particles.
Figure 17:
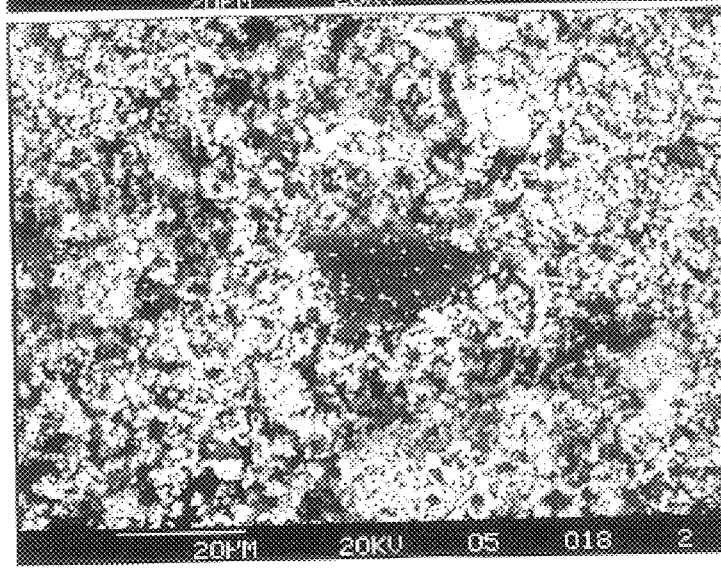
FIG. 17 is an SEM photomicrograph imaged in a back-scattered electron mode of the view shown in FIG. 16.
Figure 18:
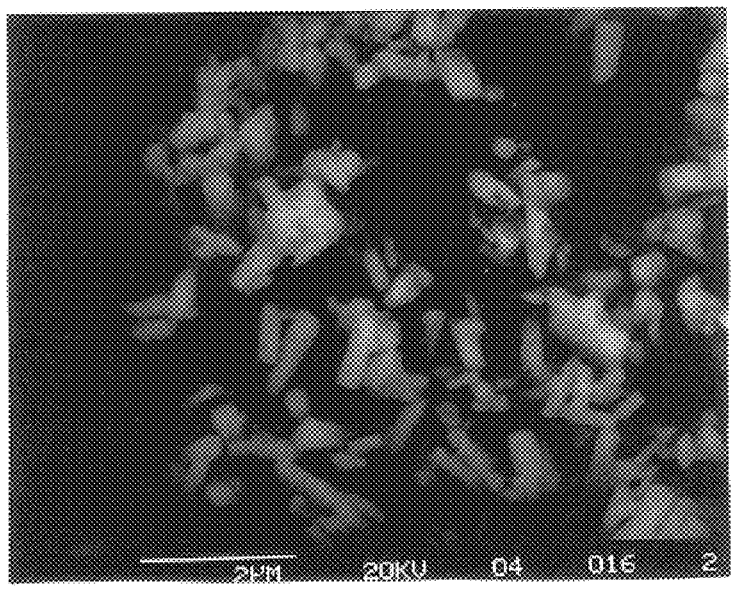
FIG. 18 is an SEM photomicrograph of a portion of the precipitates shown in FIGS. 16 and 17, at a higher magnification; and, FIG. 19 is a schematic diagram of an illustrative mechanism for implementing an embodiment of the method of the present invention.

The dramatic differences from prior art processes, both in terms of the actual impurity uptake mechanism, and in terms of the nature of the by-product formed thereby, is highlighted by the SEM photomicrographs shown in FIGS. 16–18. Those SEM images pertain to a prior art precipitation method of impurity extraction, wherein limestone particles are introduced into a fluid containing lead at a concentration of 10000 ppm. The SEM image of FIG. 16 shows a 1000× magnification view obtained using a secondary electron imaging mode of the lead carbonate precipitate 16a that results from the prior art process. The large particle 16b shown is a limestone particle that is yet to be dissolved in the given solution. The same view as that shown in FIG. 16 but obtained using the back-scattered electron imaging mode is shown in the SEM of FIG. 17. The very fine flaky elements shown in FIG. 16 are clearly indicated in FIG. 17 to be the precipitated lead carbonate. The SEM image of FIG. 18 showing a 13000× magnification view of the precipitated lead carbonate flakes reveal them to actually be needle-like in structure, averaging approximately 0.5 microns in length and approximately 0.2–0.3 microns in width.

The submicron flakes making up the resulting lead carbonate sludge are completely of a strikingly different nature compared to the concreted nodules grown in accordance with the present invention, as both their size and form would indicate. Such submicron flakes are typical of all chemical precipitation methods, generally, where the dissolved contaminant is transformed into a very fine precipitate formed in solution by altering and maintaining accurate control over pH. After their formation in solution, the precipitate necessitates requisite coagulation and flocculation steps, followed by the further steps of sedimentation and sand filtration for solids removal. What results in the end is a great volume of toxic sludge.

In contrast, the nodules formed in accordance with the present invention necessitates neither an environmental pH adjustment step, nor any subsequent coagulation, flocculation, and elaborate solids removal steps. The nodules of the present invention are at least several orders of magnitude greater in size than the flakes of FIG. 18, and possess, generally, a compact, rounded contour highly conducive to simple dewatering. While the present invention is not limited to any grain size, a typical application of the subject method utilizing shell components comminuted to an average grain size of approximately 200 microns yields, on average, granules ranging approximately 40 microns to 100 microns in length. The reduction in grain size is typically attributable to the breakage of the shell components and/or by-product nodules which invariably occurs during mixing or other mechanical agitation effected to aid in such mixing of the shell components with the dissolved impurity contaminants. Breakage should be significantly minimized, if not eliminated, by utilizing a flow-through liquid/solid contacting device or by employing a suitable impeller design. In addition, the crystalline biometallic nodules resulting from the process are instantly settleable, may be conveniently removed from a pellet reactor or fluidized bed, and easily dewatered, without the addition of coagulating and flocculating chemicals. A granular residue results from a typical application of the subject method that, when dried, forms hard, compact nodules.

Numerous exemplary experiments were conducted of the subject method using various shell component materials (at various quantities) and various metal impurity materials (at various concentrations in solution) to illustrate and demonstrate various applications of the subject method. Except where specifically noted otherwise, the exemplary experiments were conducted in accordance with the following general procedure. First, a 50 mL sample of a nitrate solution was prepared containing a dissolved metal impurity. The concentration of dissolved metal in the solution was controlled according to the given experiment's specific conditions. The intended metal concentrations were confirmed by Atomic Absorption Analysis to insure accuracy. A shell stock containing shell material taken from a preselected organism such as clam, oyster, and lobster was then comminuted to form a plurality of shell components having a grain size between approximately 150 microns and 250 microns. One gram of the comminuted shell components was then placed into a test tube with the 50 mL sample of nitrate solution prepared with a desired concentration of cadmium, lead, or other metal impurity. The contents of the test tube were permitted to mix and react for a predetermined contact time—which was varied for different experiments. During this time, conversion occurs of at least a portion of the shell components to by-product nodules that contain at least a portion of the impurity material in a biometallic carbonate form. Following the passage of this contact time, the contents of the test tube were centrifuged, and the supernatant decanted for analysis.

Atomic Absorption measurements were employed to analyze the decanted supernatant for residual impurity metal content, as well as for calcium content. Shown in Tables 1.1–9.2 are summaries of exemplary experiments thus conducted with various shell materials, and various impurity constituents initially present in the prepared solution at various concentrations.

Note that for the purposes of comparison, control experiments were conducted for each exemplary experiment conducted in accordance with the present invention. The control experiments were conducted using limestone and chitosan as the impurity uptake material.

EXAMPLE 1

Extraction of Cadmium from Cadmium Nitrate [Cd(NO$_3$)$_2$.4H$_2$O] solution

TABLE 1.1

Initial Cd concentration in solution: 0.0483 mol/L; 5210 ppm, initial pH = 5.53

| Contact | SHELL MATERIALS | | | CONTROLS | |
|---|---|---|---|---|---|
| Time | Clam | Oyster | Lobster | Limestone | Chitosan |
| 1 hr | 1,587 | 5,037 | 27 | 5,037 | 3,054 |
| 24 hr | 0.30 | 4,855 | 3.7 | 5,194 | 2,897 |
| 168 hr | 0.05 (pH = 7.25) | 3,576 (pH = 5.85) | 0.30 (pH = 7.96) | 3,576 (pH = 5.73) | 2,688 (pH = 6.56) |

Comparing clam with oyster (both are bivalve mollusks, comprising approximately 95% calcium carbonate), clam shell is orders of magnitude more effective than oyster shell in reducing cadmium concentration, regardless of contact time. For example, in one hour contact time, clam is over 3 times more effective than oyster (relative concentration reduction factor: 5037/1587≅3.2), while at longer times, clam is far superior to oyster, or any other material employed. For example, at 24 hrs and at 7 days, clam is over 15,000 times and over 70,000 times more effective than oyster, respectively.

It is also noted that as cadmium is extracted from solution using either clam or lobster shells, the pH remains in the neutral range. At this concentration, clam is generally more effective than lobster, except at the shortest contact times.

Regarding the controls, chitosan is slightly more effective than limestone, which in turn, is about as effective as oyster. In comparing shells and chitosan, at all contact times examined between 1 hour and 7 days, lobster and clam shells are far superior in impurity extraction capability. At a 1 hour contact time, for example, lobster is 113 times more effective in extracting cadmium than chitosan. At longer contact times, the difference becomes even more striking. Lobster shell is 783 times and 9,000 times more effective than chitosan at, respectively, the 24 hour and 7 day contact times; while, clam shell is over 9,500 times and 53,000 times more effective than chitosan at those respective contact times.

Summary: In cadmium uptake from solution by shell materials, the "order of effectiveness" beyond the initial first hour of contact time is as follows: Clam>>Lobster>>>>Oyster.

TABLE 1.2

Initial Cd concentration in solution: 0.1448 mol/L, 16,277 ppm, initial pH = 5.35

| Contact | SHELL MATERIALS | | | CONTROLS | |
|---|---|---|---|---|---|
| Time | Clam | Oyster | Lobster | Limestone | Chitosan |
| 24 hr | 1,092 | 14,386 | 5,907 | 14,911 | 11,446 |
| 168 hr | 2.73 (pH = 6.99) | 13,704 (pH = 5.58) | 5,697 (pH = 6.35) | 12,496 (pH = 5.35) | 12,391 (pH = 5.96) |

At higher initial concentrations, the differences between the effectiveness of shell materials in extracting cadmium from solution becomes even more pronounced, with clam shell appearing clearly to be the most effective. The Cadmium uptake by clam is also accompanied by a pH increase, which, upon reaching a neutral range, remains steady. At the highest concentrations of Cadmium examined, lobster shell begins to lose its effectiveness, with oyster shell being no more effective than the controls. As for the controls, chitosan is slightly more effective than limestone which, in turn, is about as effective as oyster shell. These materials remain unable to reduce the initial Cadmium levels to below 12,000 ppm; and, the solutions remain acidic. Clam shell, on the other hand, reduces the Cadmium concentration from its initial level of 16,277 ppm to a level of approximately 2.7 ppm. This represents a 99.98% reduction. Lobster shell effects a reduction of only 65%, while oyster, limestone, and chitosan merely effect modest reductions of 16%, 23%, and 24%, respectively.

Summary: At these highest concentrations, the "order of effectiveness" of shell materials in extracting cadmium from solution, is (beyond 24 hrs.): Clam>>>>Lobster>Oyster.

EXAMPLE 2

Extraction of Lead from Lead Nitrate [Pb(NO$_3$)$_2$] solution

TABLE 2.1

Initial Pb concentration in solution: 0.010 mol/L; 2,000 ppm, initial pH = 5.43

| Contact | SHELL MATERIALS | | | CONTROLS | |
|---|---|---|---|---|---|
| Time | Clam | Oyster | Lobster | Limestone | Chitosan |
| 5 min. | 0.15 | 598 | 0.41 | — | 1131 |
| 1 hr | 0.12 (pH = 7.83) | 0.27 (pH = 7.82) | 0.40 (pH = 7.35) | 152* (pH = 5.73) | 907 (pH = 5.53) |

Summary: At this medium high concentration, the "order of effectiveness" of shell materials in extracting lead from solution is: At very short times: Clam≈Lobster>>>>Oyster. At longer times: Clam≈Oyster≈Lobster. Chitosan is rather ineffective compared to the shell materials. Limestone is more effective than chitosan, but still far less effective than the shell materials.

TABLE 2.2

Initial Pb concentration in solution: 0.0483 mol/L; 10,000 ppm, initial pH = 4.54

Residual Concentrations (Effluent), ppm

| Contact Time | SHELL MATERIALS | | | CONTROLS | |
|---|---|---|---|---|---|
| | Clam | Oyster | Lobster | Limestone | Chitosan |
| 5 min. | 0.29 | 8,987 | 2,766 | 8,176 | 6,232 |
| 1 hr | 0.21 | 0.41 | 0.60 | 4,701 | 5,048 |
| 168 hr | 0.26 | 0.28 | 0.65 | 6.84 | 5,007 |
| | (pH = 7.60) | (pH = 7.51) | (pH = 7.34) | (pH = 7.28) | (pH = 5.76) |

Summary: In lead uptake from solution by shell materials, the "order of effectiveness" is: At very short times: Clam>>>>Lobster>Oyster. At longer times: Clam≈Oyster≈Lobster.

TABLE 2.3

Initial Pb concentration in solution: 0.097 mol/L; 20,000 ppm, initial pH = 4.709

Residual Concentrations (Effluent), ppm

| Contact Time | SHELL MATERIALS | | | CONTROLS | |
|---|---|---|---|---|---|
| | Clam | Oyster | Lobster | Limestone | Chitosan |
| 5 min. | 15,522 | 19,023 | 8,958 | — | 14,262 |
| 1 hr | 2,179 | 1,394 | 1,709 | — | 12,979 |
| 5 hr | 1,373 | 0.50 | 0.26 | — | 12,873 |
| 24 hr | 0.36 | 0.65 | 0.41 | — | 13,340 |
| 336 hr | 0.26 | 0.34 | 0.35 | — | 11,893 |
| | (pH = 7.34) | (pH = 7.45) | (pH = 7.05) | | (pH = 5.60) |

Summary: In lead uptake from solution by shell materials, the "order of effectiveness" is: At very short times: Lobster>Clam>Oyster. As reaction time is increased, at 5 hr. for example: Lobster≈Oyster>>>>Clam. Eventually, all shells become equally effective, and they are able to remove about 100% of the lead, whereas chitosan is not able to reduce the lead below about 60% of the initial concentration.

TABLE 2.4

Initial Pb concentration in solution: 0.1448 mol/L, 30,000 ppm, initial pH = 3.67

Residual Concentrations (Effluent), ppm

| Contact Time | SHELL MATERIALS | | | CONTROLS | |
|---|---|---|---|---|---|
| | Clam | Oyster | Lobster | Limestone | Chitosan |
| 5 min. | 26,493 | 28,594 | 16,456 | 25,071 | 21,545 |
| 1 hr | 10,971 | 2,334 | 10,329 | 22,108 | 21,475 |
| 24 hr | 5,923 | 0.67 | 2,906 | 12,079 | 20,074 |
| 336 hr | 0.37 | 0.56 | 3,443 | 4.56 | 18,464 |
| | (pH = 7.23) | (pH = 7.34) | (pH = 5.25) | (pH = 7.19) | (pH = 5.13) |

At very short times: Lobster>Clam≈Oyster. Within just 1 hour, oyster surpasses both lobster and clam in the amount of lead it can extract. Eventually, clam and oyster extract about 100% of the lead, while lobster cannot extract Pb below a level of about 3,000 ppm.

Summary: At these highest concentrations, the "order of effectiveness" of shell materials in extracting lead from solution, is: At short and intermediate times (at 24 hr., for example): Oyster>>>>Lobster>Clam. At longer times (336 hr): Clam≈Oyster>>>>Lobster.

NOTE: One gm oyster shell in 50 ml water containing 30,000 ppm lead, can reduce the concentration to 0.67 ppm within 24 hrs. This corresponds to removal of 1.5 gm lead per 1 gm oyster shell [1.5 gm=50 ml×30,000 mg/l×$10^{-6}$ gm]. Both clam and oyster shells can effect removal of about 150% of their weight in lead.

EXAMPLE 3

Extraction of Nickel from Nickel Nitrate [$Ni(NO_3)_2 \cdot 6H_2O$] solution

TABLE 3.1

Initial Ni concentration in solution: 0.0483 mol/L; 2,835 ppm, initial pH = 5.92

Residual Concentrations (Effluent), ppm

| Contact Time | SHELL MATERIALS | | | CONTROLS | |
|---|---|---|---|---|---|
| | Clam | Oyster | Lobster | Limestone | Chitosan |
| 24 hr | 2,430 | 2,565 | 743 | 2,723 | 1,530 |
| 336 hr | 1,620 | 1,845 | 342 | 2,093 | 1,283 |
| | (pH = 7.30) | (pH = 7.20) | (pH = 7.50) | (pH = 7.34) | (pH = 7.41) |

Summary: In nickel uptake from solution by shell materials, the "order of effectiveness" is (336 hr.): Lobster>Clam≈Oyster.

TABLE 3.2

Initial Ni concentration in solution: 0.1448 mol/L, 8,498 ppm, initial pH = 5.30

Residual Concentrations (Effluent), ppm

| Contact Time | SHELL MATERIALS | | | CONTROLS | |
|---|---|---|---|---|---|
| | Clam | Oyster | Lobster | Limestone | Chitosan |
| 24 hr | 6890 | 7304 | 4364 | 7350 | 5926 |
| 336 hr | 5191 | 6155 | 3859 | 6798 | 5604 |
| | (pH = 6.82) | (pH = 7.09) | (pH = 6.88) | (pH = 6.94) | (pH = 7.02) |

Summary: At these highest concentrations, the "order of effectiveness" of shell materials in extracting nickel from solution (at 336 hr.) is: Lobster>Clam>Oyster. At these high concentrations of Nickel, it is evident that the overall effectiveness of all materials is low.

EXAMPLE 4

Extraction of Chromium from Chromium Nitrate [$Cr(NO_3)_3 \cdot 9H_2O$] solution

TABLE 4.1

Initial Cr concentration in solution: 0.0483 mol/L; 2,511 ppm, initial pH = 2.65

Residual Concentrations (Effluent), ppm

| Contact Time | SHELL MATERIALS | | | CONTROLS | |
|---|---|---|---|---|---|
| | Clam | Oyster | Lobster | Limestone | Chitosan |
| 1 hr | 513 | 0.21 | 0.41 | 455 | 2,253 |
| 24 hr | 0.21 | 0.31 | 0.10 | 0.10 | 2,501 |

TABLE 4.1-continued

Initial Cr concentration in solution: 0.0483 mol/L; 2,511 ppm, initial pH = 2.65

Residual Concentrations (Effluent), ppm

| Contact Time | SHELL MATERIALS | | | CONTROLS | |
|---|---|---|---|---|---|
| | Clam | Oyster | Lobster | Limestone | Chitosan |
| | (pH = 7.40) | (pH = 7.25) | (pH = 6.93) | (pH = 7.33) | (pH = 2.97) |

Summary: In chromium uptake from solution by shell materials, the "order of effectiveness" is: At short times (1 hour): Oyster≈Lobster>>>Clam. At longer times (24 hours): Oyster≈Lobster≈Clam.

EXAMPLE 5

Extraction of Gold from Gold Chloride [$HAuCl_4 \cdot 3H_2O$] solution

TABLE 5.1

Initial Au concentration in solution: 0.025 mol/L, 5000 ppm, initial pH = 1.59

Residual Concentration (Effluent), ppm

| Contact Time | SHELL MATERIALS | | | CONTROLS | |
|---|---|---|---|---|---|
| | Clam | Oyster | Lobster | Limestone | Chitosan |
| 1 hr | 3,340 | 3,595 | 631 | — | — |
| 168 hr | 0.1 | 1,970 | 2.8 | — | 92 |
| | (pH = 7.38) | (pH = 5.94) | n(pH = 7.57) | | (pH = 2.45) |

Summary: At these concentrations, the "order of effectiveness" of shell materials in extracting gold from solution, is: At short times (1 hour): Lobster>Clam≈Oyster. At longer times (168 hours): Clam>>Lobster>>>Oyster.

EXAMPLE 6

Extraction of Aluminum from Aluminum Nitrate [$Al(NO_3)_3 \cdot 9H_2O$] solution

TABLE 6.1

Initial Al concentration in solution: 0.0483 mol/L; 1,303 ppm, initial pH = 3.15

Residual Concentration (Effluent), ppm

| Contact Time | SHELL MATERIALS | | | CONTROLS | |
|---|---|---|---|---|---|
| | Clam | Oyster | Lobster | Limestone | Chitosan |
| 1 hr | 361 | 0.10 | 0.10 | 2.21 | — |
| 24 hr | 0.10 | 0.10 | 0.10 | 0.10 | 1,066* |
| | (pH = 6.94) | (pH = 7.01) | (pH = 6.95) | (pH = 7.37) | (pH = 3.87) |

*concentration after 14 days (336 hr)

Summary: In aluminum uptake from solution by shell materials, the "order of effectiveness" is: At short times (1 hour): Oyster≈Lobster>>>>Clam. At longer times (beyond 1 hour): Oyster≈Lobster≈Clam.

TABLE 6.2

Initial Al concentration in solution: 0.1448 mol/L, 3,907 ppm, initial pH = 2.80

Residual Concentrations (Effluent), ppm

| Contact Time | SHELL MATERIALS | | | CONTROLS | |
|---|---|---|---|---|---|
| | Clam | Oyster | Lobster | Limestone | Chitosan |
| 24 hr | 3.86 | 51.5 | 3,574 | 1,449 | — |
| 168 hr | 0.11 | 2.25 | 3,843 | 1,149 | 3,201* |
| | (pH = 6.44) | (pH = 7.20) | (pH = 3.74) | (pH = 4.76) | (pH = 3.47) |

*concentration after 14 days (336 hr)

Summary: At these highest concentrations, the "order of effectiveness" of shell materials in extracting aluminum from solution, is (24 hr.): Clam>>Oyster>>Lobster. At longer times: Clam>>Oyster>>>>Lobster.

EXAMPLE 7

Extraction of Copper from Cupric Nitrate [$Cu(NO_3)_2 \cdot 2\frac{1}{2}H_2O$] solution

TABLE 7.1

Initial Cu concentration in solution: 0.0483 mol/L; 3,069 ppm, initial pH = 4.22

Residual Concentrations (Effluent), ppm

| Contact Time | SHELL MATERIALS | | | CONTROLS | |
|---|---|---|---|---|---|
| | Clam | Oyster | Lobster | Limestone | Chitosan |
| 1 hr | 2,742 | 2,169 | 394 | 2,138 | 1,381 |
| 24 hr | 1.23 | 1.54 | 19.4 | 1.94 | 1,207 |
| 336 hr | 0.31 | 0.31 | 3.89 | 0.21 | 1,379 |
| | (pH = 6.56) | (pH = 6.93) | (pH = 7.19) | (pH = 6.51) | (pH = 4.83) |

Despite fast initial uptake of copper (at ≦1 hr.), lobster eventually loses its advantage and is overtaken by the other shells. From additional experiments with lobster on the uptake of copper, it has been determined that lobster cannot remove copper to a level below about 4 ppm, regardless of initial concentration and contact time. Thus, even when the initial concentration is as low as 10 ppm, copper extraction by lobster stops when the concentration reaches approximately 3.9 ppm.

Summary: In copper uptake from solution by shell materials, the "order of effectiveness" is: Beyond the first hour (24 hr): Clam>Oyster>>Lobster. At longer times (beyond 24 hours): Clam≈Oyster>>Lobster.

TABLE 7.2

Initial Cu concentration in solution: 0.1448 mol/L, 9,202 ppm, initial pH = 3.85

Residual Concentrations (Effluent), ppm

| Contact Time | SHELL MATERIALS | | | CONTROLS | |
|---|---|---|---|---|---|
| | Clam | Oyster | Lobster | Limestone | Chitosan |
| 1 hr | 3,998 | 6,707 | 5,576 | 7,496 | 6,943 |
| 24 hr | 1.16 | 1.89 | 4,603 | 3,577 | 6,838 |
| 336 hr | 0.42 | 0.53 | 2,735 | 0.63 | 6,759 |

TABLE 7.2-continued

Initial Cu concentration in solution: 0.1448 mol/L, 9,202 ppm, initial pH = 3.85

| Contact | SHELL MATERIALS | | | CONTROLS | |
|---|---|---|---|---|---|
| Time | Clam | Oyster | Lobster | Limestone | Chitosan |
| | (pH = 6.20) | (pH = 6.23) | (pH = 4.61) | (pH = 6.08) | (pH = 4.33) |

At these higher copper concentrations, lobster completely loses its effectiveness compared to the bivalves.

Summary: At these highest concentrations, the "order of effectiveness" of shell materials in extracting copper from solution, is: Beyond the first hour (24 hr): Clam>Oyster>>>>Lobster. At longer times (336 hr): Clam>Oyster>>>>Lobster.

EXAMPLE 8

Extraction of Silver from Silver Nitrate [Ag(NO$_3$)] solution

TABLE 8.1

Initial Ag concentration in solution: 0.0483 mol/L; 5,210 ppm, initial pH = 4.80

| Contact | SHELL MATERIALS | | | CONTROLS | |
|---|---|---|---|---|---|
| Time | Clam | Oyster | Lobster | Limestone | Chitosan |
| 1 hr | 2,798 | 890 | 314 | 3,711 | 1,311 |
| 24 hr | 808 | 820 | 87 | 691 | 1,101 |
| 168 hr | 656 | 925 | 80* | 761* | 1,112* |
| | (pH = 7.28) | (pH = 7.28) | (pH = 7.97) | (pH = 7.23) | (pH = 6.37) |

*concentration after 14 days (336 hr)

Summary: In silver uptake from solution by shell materials, the "order of effectiveness" is: At short times (at 1 hour): Lobster>Oyster>Clam. At longer times (beyond 24 hour): Lobster>Clam>Oyster.

TABLE 8.2

Initial Ag concentration in solution: 0.1448 mol/L, 15,619 ppm, initial pH = 4.54

| Contact | SHELL MATERIALS | | | CONTROLS | |
|---|---|---|---|---|---|
| Time | Clam | Oyster | Lobster | Limestone | Chitosan |
| 1 hr | 13,077 | 10,872 | 6,829 | 14,761 | 11,454 |
| 24 hr | 8,575 | 1,286 | 674 | 4,655 | 11,362 |
| 168 hr | 980 | 1,439 | 827 | 1,133 | 11,086 |
| | (pH = 7.00) | (pH = 6.71) | (pH = 7.02) | (pH = 6.74) | (pH = 6.14) |

Summary: At these highest concentrations, the "order of effectiveness" of shell materials in extracting silver from solution, is: At short times (1 hr): Lobster>Oyster>Clam. At longer times (24 hrs): Lobster>Clam>Oyster.

EXAMPLE 9

Extraction of Zinc from Zinc Nitrate [Zn(NO$_3$)$_2$.6H$_2$O] solution

TABLE 9.1

Initial Zn concentration in solution: 0.0483 mol/L; 3,158 ppm, initial pH = 5.40

| Contact | SHELL MATERIALS | | | CONTROLS | |
|---|---|---|---|---|---|
| Time | Clam | Oyster | Lobster | Limestone | Chitosan |
| 1 hr | 1,723 | 2,641 | 1,378 | 2,526 | 1,837 |
| 24 hr | 253 | 632 | 804 | 1,034 | 1,493 |
| 168 hr | 35 | 80 | — | 132 | 1,522 |
| | (pH = 6.71) | (pH = 6.48) | | (pH = 6.80) | (pH = 6.06) |

Summary: After an initial faster uptake by lobster, zinc uptake by shell materials show the following "order of effectiveness": Beyond the first hour (24 hr.): Clam>Oyster>Lobster. At longer times (168 hours): Clam>Oyster.

TABLE 9.2

Initial Zn concentration in solution: 0.1448 mol/L, 9,467 ppm, initial pH = 5.01

| Contact | SHELL MATERIALS | | | CONTROLS | |
|---|---|---|---|---|---|
| Time | Clam | Oyster | Lobster | Limestone | Chitosan |
| 24 hr | 1,183 | 4,508 | 6,030 | 6,142 | 6,875 |
| 168 hr | 186 | 620 | 4,903 | 304 | 7,326 |
| 336 hr | 107 | 220 | 2,423 | 209 | 7,326 |
| | (pH = 6.65) | (pH = 6.43) | (pH = 6.05) | (pH = 6.46) | (pH = 6.07) |

Summary: At these highest concentrations, the "order of effectiveness" of shell materials in extracting zinc from solution, is: Within the first 24 hours: Clam>Oyster>Lobster. At long times (168 hours): Clam>Oyster>Lobster. Even at very long times, the effectiveness of lobster does not improve noticeably, actually diminishing in comparative effectiveness relative to the bivalves: Beyond (336 hr): Clam>Oyster>>Lobster.

As demonstrated by these experiments, certain shell materials are particularly well-suited for the rapid and efficient removal of certain impurity types. The levels of effectiveness in impurity removal realized with the subject method is remarkably higher—by several orders of magnitude in certain cases—than that realized by prior art methods utilizing limestone or chitosan. For instance, substantially all of the dissolved heavy metal impurities such as cadmium and lead may be removed utilizing one or more preselected shell materials, even when they are initially present in solution at concentrations as high as 30000 ppm (for lead).

Turning now to the particular case wherein lobster shell material is utilized in the subject method, Table 10 shows a comparative summary of the demonstrated effectiveness relative to prior art methods.

TABLE 10

Comparison of the Relative Effectiveness of Lobster (L) and Chitosan (Chtsn)
in Extracting Heavy Metal Ions from Aqueous Solutions Key to grades of effectiveness 1 to 10X: >  
10 to 100: >>  
100 to 1000X: >>>  
over 1000X: >>>>

Effectiveness

| | | Most | | Least | Comments |
|---|---|---|---|---|---|
| Cadmium | Initial concentration: 0.048 M Contact time: | | | | |
| | 24 hrs. % Cd remaining: | L 0.07% | >>> | Chtsn 56% | L is thus 800 times more effective than Chtsn. |
| | Initial concentration: 0.145 M 24 hrs. % Cd remaining: | L 36% | > | Chtsn 70% | L is about twice as effective as Chtsn. |
| Lead | Initial concentration: 0.048 M Contact time: | | | | |
| | 168 hrs.: % Pb remaining: | L 0.007% | >>>> | Chtsn 51% | L is thus 7000 times more effective than Chtsn. |
| | Initial concentration: 0.145 M Contact time: | | | | |
| | 24 hrs: % Pb remaining: | L 9.8% | > | Chtsn 67% | L is almost 7 times more effective than Chtsn. |
| Nickel | Initial concentration: 0.048 M Contact time: | | | | |
| | 24 hrs.: % Ni remaining | L 26% | > | Chtsn 54% | L is twice as effective as Chtsn. |
| | Initial concentration: 0.145 M Contact time: | | | | |
| | 24 hrs.: % Ni remaining: | L 51% | > | Chtsn 70% | |
| Aluminum | Initial concentration: 0.048 M Contact time: | | | | |
| | 24 hrs.: % Al remaining: | L 0.008% | >>>> | Chtsn 82% | L is thus over 10,000 times more effective than Chtsn. |
| Copper | Initial concentration: 0.048 M Contact time: | | | | |
| | 24 hrs.: % Cu remaining: | L 0.63% | >> | Chtsn 39% | L is thus 62 times more effective than Chtsn. |
| | Initial concentration: 0.145 M Contact time: | | | | |
| | 24 hrs.: % Cu remaining: | L 50% | > | Chtsn 74% | |
| Silver | Initial concentration: 0.048 M Contact time: | | | | |
| | 24 hrs.: % Ag remaining: | L 1.7% | >> | Chtsn 21% | L is thus over 12 times more effective than Chtsn. |
| | Initial concentration: 0.145 M Contact time: | | | | |
| | 24 hrs.: % Ag remaining: | L 4.3% | >> | Chtsn 73% | L is thus 17 times more effective than Chtsn. |
| Zinc | Initial concentration: 0.048 M Contact time: | | | | |
| | 24 hrs.: % Zn remaining: | L 26% | > | Chtsn 47% | |
| | Initial concentration: 0.145 M Contact time: | | | | |
| | 168 hrs.: % Zn remaining: | L 52% | > | Chtsn 77% | |
| Chromium | Initial concentration: 0.048 M | | | | |

TABLE 10-continued

Comparison of the Relative Effectiveness of Lobster (L) and Chitosan (Chtsn) in Extracting Heavy Metal Ions from Aqueous Solutions Key to grades of effectiveness 1 to 10X: >          100 to 1000X: >>>
10 to 100: >>        over 1000X: >>>>

Effectiveness

| | | Most | | Least | Comments |
|---|---|---|---|---|---|
| | Contact time: | | | | |
| | 24 hrs.: | L | >>>> | Chtsn | L is thus almost 25,000 times more effective than Chtsn. |
| | % Cr remaining: | 0.004% | | 99.6% | |
| Gold | Initial concentration: 0.025 M Contact time: | | | | |
| | 168 hrs.: | L | >> | Chtsn | L is thus almost 33 times more effective than Chtsn. |
| | % Au remaining: | 0.056% | | 67% | |

The varying adaptability of different shell materials to removing different impurity materials in accordance with the present invention is evident from the exemplary experiments described in preceding paragraphs. For instance, clam, oyster, and lobster display major differences in their metal uptake capabilities. The extent of the differences appear to depend on the metal ion being taken up, the initial metal concentration, and the contact time employed. A comparative summary of such differences between the use of clam shell material and the use of oyster shell material is shown in Table 11 to further illustrate the fact that shell materials of the same Phyla, and even of the same class, may exhibit different metal uptake properties.

The differences in extraction ability result in domains having various degrees of effectiveness for various metal ions, concentrations, and reaction times. Clam is superior to oyster with Cd, Au, Al and Zn, while oyster is more effective than clam with Ag and Cr. For lead, the results are transitional, with the effectiveness of oyster overtaking clam at higher concentrations and longer times.

In all cases, limestone is greatly inferior to the best shell material and frequently inferior to even the least effective shell. A further problem with the use of limestone is the production of copious amounts of fine precipitates introducing significant and costly sludge disposal problems. The use of clam and oyster does not produce such precipitates. The differences in behavior may be advantageously exploited by combining shells in various proportions, for example, according to the type known to be most effective in extracting a particular metal ion at a particular initial condition, in a given time period. It should thus be possible to formulate shell combinations "tailor-made" to address a particular aqueous condition, thereby providing an optimized treatment procedure given a specific metal pollution problem. The particular mode of application may be to use the shells as a specifically formulated mixture, or sequentially (singly, if appropriate), in a series of flow reactors.

Some examples of such applications might be:
  Rapid treatments of extremely high concentrations of a single metal pollutant.
  Multi-metal pollution problems.
  It should also be possible, if so desired, to control the operation so that one metal might be preferentially be removed from a multi-metal mixture.
  Removing industrial metal contaminants from water so effectively, that the resulting effluent released to the environment falls within drinking water maximum contaminant levels (MCL).

TABLE 11

Comparison of the Relative Effectiveness of Clam(C) and Oyster(O) in Extracting Heavy Metal Ions from Aqueous Solutions
Molarities of 0.048, 0.097 and 0.145 M, represent very high concentrations, for example, they correspond to 10,000, 20,000, and 30,000 ppm of Lead, respectively.

Key to grades of effectiveness 1 to 10X: >          100 to 1000X: >>>
10 to 100X: >>       over 1000X: >>>>

Effectiveness

| | | | Most | | Least | Comments |
|---|---|---|---|---|---|---|
| Cadmium | Initial concentration: 0.048 M Contact time: | | | | | |
| | 1 hr. | | C | > | O | |
| | 24 hrs. | | C | >>>> | O | C is ∴ over 15,000 times more effective than O. |
| | % Cd remaining: | | 0.006% | | 93% | |
| | Initial concentration: 0.145 M | | | | | |

TABLE 11-continued

Comparison of the Relative Effectiveness of Clam(C) and Oyster(O) in
Extracting Heavy Metal Ions from Aqueous Solutions
Molarities of 0.048, 0.097 and 0.145 M, represent very high
concentrations, for example, they correspond to 10,000,
20,000, and 30,000 ppm of Lead, respectively.

Key to grades of effectiveness 1 to 10X: >          100 to 1000X: >>>
10 to 100X: >>       over 1000X: >>>>

|  |  | Effectiveness | | |
|---|---|---|---|---|
|  |  | Most | Least | Comments |
| | Contact time: | | | |
| | 1 hr. | C | > | O | |
| | 24 hrs. | C | >> | O | C is ∴ over 13 times |
| | % Cd remaining: | 6.7% | | 88.4% | more effective than O. |
| | 168 hrs. | C | >>>> | O | C is about 5,000 times |
| | % Cd remaining: | 0.017% | | 84.2% | more effective than O. |
| Gold | Initial concentration: 0.025 M | | | | |
| | Contact time: | | | | |
| | 1 hr. | C | ≅ | O | |
| | 168 hr. | C | >>>> | O | C is almost 20,000 times |
| | % Au remaining: | 0.002% | | 39.4% | more effective than O. |
| Aluminum | Initial concentration: 0.145 M | | | | |
| | Contact time: | | | | |
| | 1 hr. | C | > | O | C is ∴ 13 times more |
| | % Al remaining: | 0.10% | | 1.3% | effective than O. |
| Zinc | Initial concentration: 0.048 M | | | | |
| | Contact time: | | | | |
| | 24 hr. | C | > | O | |
| | % Zn remaining: | 8% | | 20% | |
| | Initial concentration: 0.145 M | | | | |
| | Contact time: | | | | |
| | 24 hr. | C | > | O | |
| | % Zn remaining: | 12% | | 48% | |
| | 168 hr. | C | > | O | |
| | % Zn remaining: | 2% | | 6.5% | |
| Copper | Initial concentration: 0.048 M | | | | |
| | Contact time: | | | | |
| | 1 hr. | O | > | C | |
| | % Cu remaining: | 70.7% | | 89.4% | |
| | >1 hr. | C | > | O | |
| | 24 hr | C | ≅ | O | |
| | % Cu remaining: | 0.04% | | 0.05% | |
| | Initial concentration: 0.145 M | | | | |
| | Contact time: | | | | |
| | 1 hr. | C | > | O | |
| | % Cu remaining: | 43% | | 73% | |
| | 24 hr. | C | ≅ | O | |
| | % Cu remaining: | 0.04% | | 0.05% | |
| Lead | Initial concentration: 0.010 M (2,000 ppm) | | | | |
| | Contact time: | | | | |
| | 5 min. | C | >>>> | O | C is almost 4,000 times |
| | % Pb remaining: | 0.008% | | 30% | more effective than O. |
| | ≧1 hr | C | ≅ | O | |
| | Initial concentration: 0.048 M (10,000 ppm) | | | | |
| | Contact time: | | | | |
| | 5 min. | C | >>>> | O | C is over 31,000 times |
| | % Pb remaining: | 0.003% | | 90% | more effective than O. |
| | ≧1 hr. | C | ≅ | O | |
| | Initial concentration: 0.097 M (20,000 ppm) | | | | |
| | Contact time: | | | | |
| | 5 min. | C | > | O | |
| | % Pb remaining: | 78% | | 95% | |
| | 1 hr. | O | > | C | O now overtakes C at |
| | % Pb remaining: | 7% | | 13.6% | longer times. |
| | 5 hr. | O | >>>> | C | O is now 2,300 times |

TABLE 11-continued

Comparison of the Relative Effectiveness of Clam(C) and Oyster(O) in
Extracting Heavy Metal Ions from Aqueous Solutions
Molarities of 0.048, 0.097 and 0.145 M, represent very high
concentrations, for example, they correspond to 10,000,
20,000, and 30,000 ppm of Lead, respectively.

Key to grades of effectiveness 1 to 10X: >           100 to 1000X: >>>
10 to 100X: >>        over 1000X: >>>>

| | | Effectiveness | | |
|---|---|---|---|---|
| | | Most | Least | Comments |
| | % Pb remaining: | 0.003% | 6.9% | more effective than C. |
| | ≧24 hr. | O | ≅ C | |
| | Initial concentration: 0.145 M (30,000 ppm) | | | |
| | Contact time: | | | |
| | 5 min. | C | ≧ O | |
| | 1 hr. | O | > C | O overtakes C at |
| | % Pb remaining: | 7.8% | 36.6% | longer times. |
| | 24 hr. | O | >>>> C | O is about 10,000 times |
| | % Pb remaining: | 0.002% | 19.7% | more effective than C. |
| | 336 hr. | O | ≅ C | |
| Silver | Initial concentration: 0.048 M | | | |
| | Contact time: | | | |
| | 1 hr. | O | > C | |
| | % Ag remaining: | 17% | 53.7% | |
| | ≧24 hr. | O | ≅ C | |
| | Initial concentration: 0.145 M | | | |
| | 1 hr. | O | > C | |
| | % Ag remaining: | 69.6% | 83.7% | |
| | 24 hr | O | > C | |
| | % Ag remaining: | 8.2% | 55% | |
| Chromium | Initial concentration: 0.048 M | | | |
| | Contact time: | | | |
| | 1 hr. | O | >>>> C | O is about 2,500 times |
| | % Cr remaining: | 0.008% | 20% | more effective than C. |
| | ≧24 hr. | O | ≅ C | |

Although this invention has been described in connection with specific forms, embodiments, and illustrative experiments thereof, it will be appreciated that various modifications other than those discussed above may be resorted to without departing from the spirit or scope of the invention. For example, equivalent elements and method steps may be substituted for those specifically shown and described, certain steps may be carried out independently of other steps, and in certain cases, particular combinations of steps may be reversed or interposed, all without departing from the spirit or scope of the invention as defined in the appended claims.

What is claimed is:

1. A method of removing a dissolved metal constituent from a contaminated liquid comprising the steps of:
   (a) providing a flow stream containing the contaminated liquid, said flow stream having a concentration of the dissolved metal constituent greater than approximately 1300 ppm;
   (b) providing a plurality of shell components by comminuting substantially to a predetermined approximate particle size a shell stock including at least one shell containing a biomineralized calcium carbonate composition;
   (c) combining said shell components and said flow stream for mixing said shell components and the dissolved metal constituent within said flow stream;
   (d) growing upon at least one of said shell components a substantially insoluble metallic nodule by maintaining said shell components in substantial contact with the dissolved metal constituent over a predetermined time period, said metallic nodule containing at least a portion of the metallic constituent in a biometallic carbonate form; and,
   (e) separating said metallic nodule from said flow stream.

2. The method as recited in claim 1 wherein said metallic nodule is formed by a nucleation process.

3. The method as recited in claim 1 wherein said portion of the metallic constituent substantially replaces at least a portion of the calcium ions of said shell component biomineralized calcium carbonate composition in forming said metallic nodule.

4. The method as recited in claim 3 wherein said shell stock includes a plurality of said shells, each said shell being selected from the group consisting of: molluscs and crustaceans.

5. The method as recited in claim 3 wherein said shell stock includes a shell selected from the group consisting of: molluscs and crustaceans.

6. The method as recited in claim 5 wherein at least one shell in said shell stock is a bivalve shell.

7. The method as recited in claim 6 wherein at least one shell in said shell stock is a clam shell.

8. The method as recited in claim 6 wherein at least one said shell in said shell stock is an oyster shell.

9. The method as recited in claim 6 wherein at least one said shell in said shell stock is a mussel shell.

10. The method as recited in claim 5 wherein at least one said shell in said shell stock is a crab shell.

11. The method as recited in claim 5 wherein at least one said shell in said shell stock is a lobster shell.

12. The method as recited in claim 1 wherein said metallic nodule has formed thereon a plurality of bulbous protuberances.

13. The method as recited in claim 12 wherein said metallic nodule includes an organic matrix defining a plurality of prismatic matrix cores, said bulbous protuberances being formed within said matrix cores.

14. A method of removing a dissolved heavy metal constituent from a contaminated liquid comprising the steps of:
 (a) providing a flow stream containing the contaminated liquid, said flow stream containing ions of the heavy metal, said heavy metal being a metal having an atomic number greater than 22, at a heavy metal concentration greater than approximately 1300 ppm;
 (b) providing a plurality of shell components by comminuting substantially to a predetermined approximate particle size a shell stock including at least one shell containing a biomineralized calcium carbonate composition;
 (c) combining said shell components and said flow stream for mixing said shell components and the dissolved heavy metal constituent of said flow stream;
 (d) growing upon a plurality of said shell components substantially insoluble metallic nodules by maintaining said shell components in substantial contact with the heavy metal constituent over a predetermined time period, each said metallic nodule containing a biometallic carbonate composition consuming at least a portion of the heavy metal constituent; and,
 (e) separating said metallic nodules from the treated flow stream.

15. The method as recited in claim 14 wherein said shell components are converted to said metallic nodules by a nucleation process, whereby a plurality of bulbous protuberant portions are grown within a plurality of prismatic matrix cores defined by an organic matrix.

16. The method as recited in claim 15 wherein the dissolved heavy metal constituent consumed in forming said metallic nodules substantially replaces at least a portion of the calcium ions of said biomineralized calcium carbonate composition of said shell components.

17. The method as recited in claim 16 wherein said shell stock includes a plurality of said shells, each said shell being selected from the group consisting of: molluscs and crustaceans.

18. The method as recited in claim 16 wherein said shell stock includes a shell selected from the group consisting of: molluscs and crustaceans.

19. The method as recited in claim 18 wherein at least one said shell in said shell stock is a bivalve shell.

20. The method as recited in claim 14 wherein the step of converting a plurality of said shell components to substantially insoluble metallic nodules includes the step of establishing said metallic nodules substantially independent of the pH value of said flow stream.

21. A method for treating contaminated liquids comprising the steps of:
 (a) providing comminuted mollusc shell components substantially devoid of chitin, said mollusc shell components having a biogenic calcareous shell composition;
 (b) passing an upstream aqueous feedstream containing metals having an atomic number greater than 22 over said comminuted mollusc shell components, said upstream aqueous feedstream having a metal concentration greater than 2000 ppm; and,
 (c) growing biometallic carbonate composition nodules on said mollusc shell components, whereby a downstream metal concentration is less than 1 ppm.

22. The method for treating contaminated liquids as recited in claim 21 wherein said comminuted mollusc shell components have a mean grain size of less than approximately 0.5 mm.

23. The method for treating contaminated liquids as recited in claim 21 including the step of removing said metal carbonate composition nodules from said feedstream upon said nodules growing to a mean grain size of approximately 40 microns.

24. The method for treating contaminated liquids as recited in claim 21 wherein the step of providing comminuted mollusc shell components includes the step of inserting said mollusc shell components in a reactor vessel.

25. The method for treating contaminated liquids as recited in claim 24 wherein said comminuted mollusc shell components are positioned within said reactor vessel in the contour of a cone.

26. The method for treating contaminated liquids as recited in claim 21 wherein the step of passing said upstream aqueous feedstream includes the step of passing said upstream aqueous feedstream for contact with said comminuted mollusc shell components through a substantially vortical path.

27. The method for treating contaminated liquids as recited in claim 21 wherein said mollusc shell components are formed of bivalve shells.

28. The method for treating contaminated liquids as recited in claim 21 including the step of removing said biometallic carbonate composition nodules from said feedstream upon said biometallic carbonate composition nodules being formed.

* * * * *